(12) United States Patent
Kanamori

(10) Patent No.: US 10,976,975 B2
(45) Date of Patent: Apr. 13, 2021

(54) INFORMATION PROCESSING APPARATUS AND CONTROL METHOD

(71) Applicant: CANON KABUSHIKI KAISHA, Tokyo (JP)

(72) Inventor: Hideyuki Kanamori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/691,440

(22) Filed: Nov. 21, 2019

(65) Prior Publication Data
US 2020/0174726 A1    Jun. 4, 2020

(30) Foreign Application Priority Data

Nov. 30, 2018    (JP) .............................. JP2018-225253

(51) Int. Cl.
*G06F 3/12*    (2006.01)

(52) U.S. Cl.
CPC ............ *G06F 3/1254* (2013.01); *G06F 3/123* (2013.01); *G06F 3/1204* (2013.01); *G06F 3/1205* (2013.01); *G06F 3/1225* (2013.01)

(58) Field of Classification Search
None
See application file for complete search history.

(56) References Cited

U.S. PATENT DOCUMENTS

| | | | | |
|---|---|---|---|---|
| 6,825,941 B1 * | 11/2004 | Nguyen | ................ | G06F 3/1227 358/1.13 |
| 7,903,267 B2 * | 3/2011 | Yasui | .................... | G06F 3/1288 358/1.13 |
| 9,665,327 B1 * | 5/2017 | Yokoohji | .............. | G06F 3/1273 |
| 10,001,954 B2 * | 6/2018 | Minagawa | ............ | G06F 3/1285 |
| 2003/0184782 A1 * | 10/2003 | Perkins | ................. | G06F 3/1225 358/1.13 |
| 2004/0085572 A1 * | 5/2004 | Gomez | ................. | G06F 3/1225 358/1.15 |
| 2005/0046886 A1 * | 3/2005 | Ferlitsch | ............... | G06F 3/1206 358/1.13 |
| 2007/0091361 A1 * | 4/2007 | Matsugashita | ........ | G06F 3/1238 358/1.15 |
| 2007/0177192 A1 * | 8/2007 | Wang | .................... | G06F 3/1288 358/1.15 |
| 2007/0263235 A1 * | 11/2007 | Oomura | ................ | G06F 3/1204 358/1.4 |
| 2008/0180741 A1 * | 7/2008 | Miyata | .................. | G06F 3/1259 358/1.15 |
| 2009/0103128 A1 * | 4/2009 | Maeda | .................. | G06F 3/1282 358/1.15 |
| 2009/0147290 A1 * | 6/2009 | Tomita | .................. | G06F 3/1204 358/1.9 |
| 2009/0316180 A1 * | 12/2009 | Nakagawa | ............ | G06F 3/1254 358/1.14 |

(Continued)

FOREIGN PATENT DOCUMENTS

JP    2015-508921 A    3/2015

*Primary Examiner* — Ted W Barnes
(74) *Attorney, Agent, or Firm* — Canon U.S.A., Inc. IP Division

(57) ABSTRACT

A print conversion utility obtains print setting information with respect to a printing apparatus, obtains print setting information set by an operating system (OS) standard print software, and executes predetermined processing in a case where both pieces of the obtained print setting information do not coincide with each other.

22 Claims, 16 Drawing Sheets

(56) References Cited

U.S. PATENT DOCUMENTS

| | | | |
|---|---|---|---|
| 2010/0195144 A1* | 8/2010 | Kawai | G06F 21/608 358/1.15 |
| 2011/0075176 A1* | 3/2011 | Nishio | G06F 3/1285 358/1.13 |
| 2011/0194141 A1* | 8/2011 | Sweet | G06F 3/1292 358/1.15 |
| 2011/0261396 A1* | 10/2011 | Takahashi | G06F 8/61 358/1.15 |
| 2012/0044534 A1* | 2/2012 | Ichikawa | G06F 3/1225 358/1.15 |
| 2012/0081740 A1* | 4/2012 | Takagi | G06F 3/1267 358/1.15 |
| 2012/0113470 A1* | 5/2012 | Atsumi | G06F 3/1204 358/1.15 |
| 2012/0254898 A1* | 10/2012 | Nakata | G06F 9/4411 719/324 |
| 2013/0033714 A1* | 2/2013 | Nakagawa | G06F 3/1205 358/1.9 |
| 2013/0094045 A1* | 4/2013 | Nakata | G06F 3/1285 358/1.13 |
| 2013/0201504 A1* | 8/2013 | Miller | G06F 3/1232 358/1.13 |
| 2014/0233050 A1* | 8/2014 | Kishida | G06F 3/1204 358/1.13 |
| 2016/0077770 A1* | 3/2016 | Morita | G06F 3/1285 358/1.15 |
| 2017/0264781 A1* | 9/2017 | Bhatt | H04N 1/00411 |
| 2018/0210684 A1* | 7/2018 | Kato | G06F 3/1226 |

* cited by examiner

FIG.4
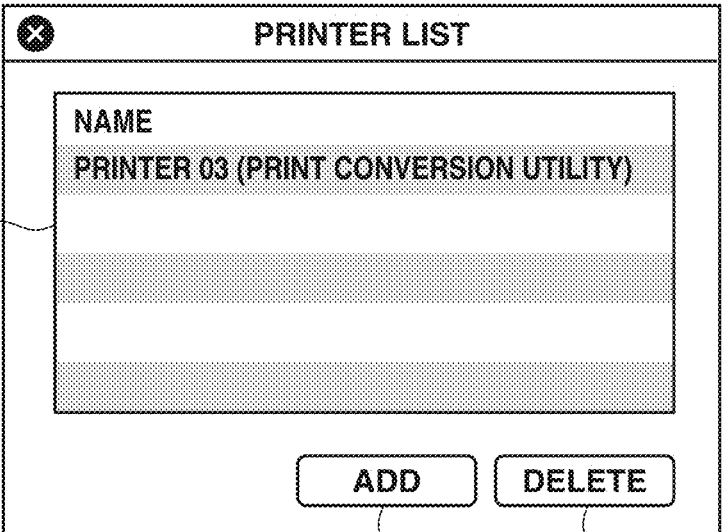
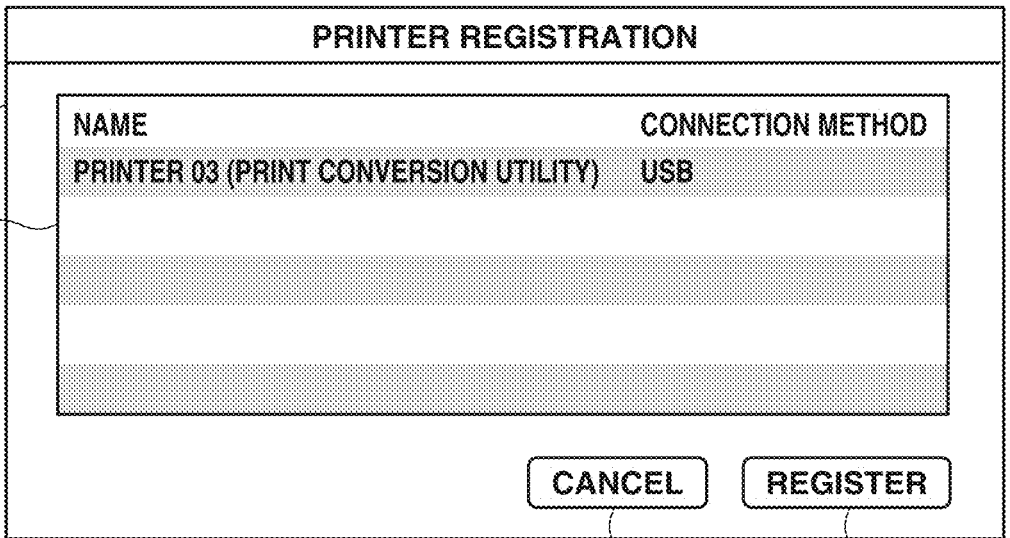

FIG.7
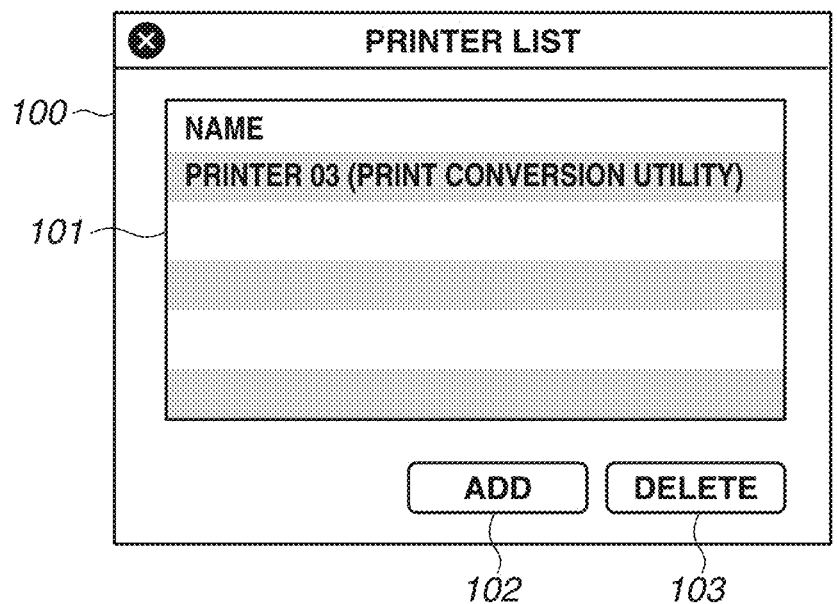
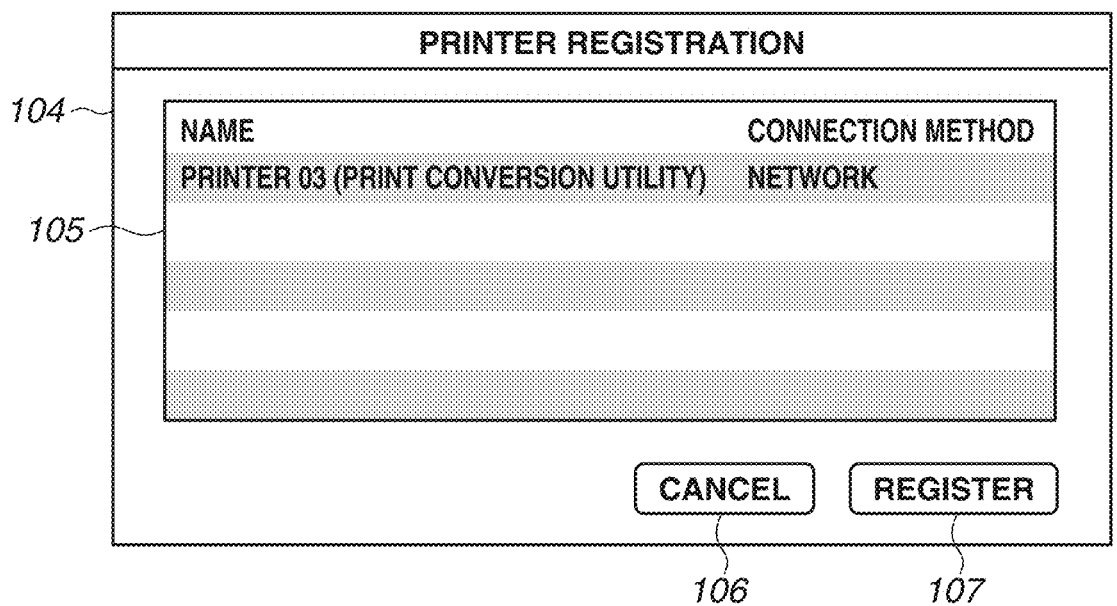

INFORMATION PROCESSING APPARATUS AND CONTROL METHOD

BACKGROUND

Field of the Disclosure

The present disclosure relates to an information processing apparatus and a control method.

Description of the Related Art

Conventionally, there are printing environments in which personal computers (hereinbelow, referred to as PCs) are connected to printers. Japanese Unexamined Patent Application Publication (Translation of PCT Application) No. 2015-508921 discusses a technique for performing printing using a standard print function (hereinbelow, referred to as an operating system (OS) standard print function) installed on an OS without requiring printer-specific software provided by a printer vendor in the printing environment. The printer-specific software is sometimes referred to as a printer driver.

However, according to Japanese Unexamined Patent Application Publication (Translation of PCT Application) No. 2015-508921, information management in a case where a printer which cannot interpret print data in a predetermined format according to the OS standard print function is connected to a PC is not considered. Therefore, there is a possibility that convenience may be deteriorated in a case where a user performs printing using a printer which cannot interpret print data in the predetermined format according to the OS standard print function.

SUMMARY

An information processing apparatus according to the present disclosure includes a first obtainment unit configured to obtain print setting information with respect to a printing apparatus, a second obtainment unit configured to obtain print setting information set by an operating system (OS) standard print software, wherein the OS standard print software generates first print data in a predetermined format in response to an instruction from an application, an execution unit configured to execute predetermined processing in a case where the print setting information with respect to the printing apparatus does not correspond to the print setting information set by the OS standard print software, and a generation unit configured to generate second print data which can be interpreted by the printing apparatus based on the first print data in a case where the print setting information with respect to the printing apparatus corresponds to the print setting information set by the OS standard print software.

Further features of the present disclosure will become apparent from the following description of exemplary embodiments with reference to the attached drawings.

BRIEF DESCRIPTION OF THE DRAWINGS

FIG. 4 illustrates a printer list screen and a printer registration screen of an operating system (OS) print system.

FIG. 7 illustrates a printer list screen and a printer registration screen of the OS print system.

DESCRIPTION OF THE EMBODIMENTS

Various exemplary embodiments of the present disclosure will now be described in detail below with reference to the attached drawings. It is noted that the following exemplary embodiments are not meant to limit the scope of the present disclosure. Further, not all combinations of features described in the exemplary embodiments are deemed to be essential.

Figure 1:
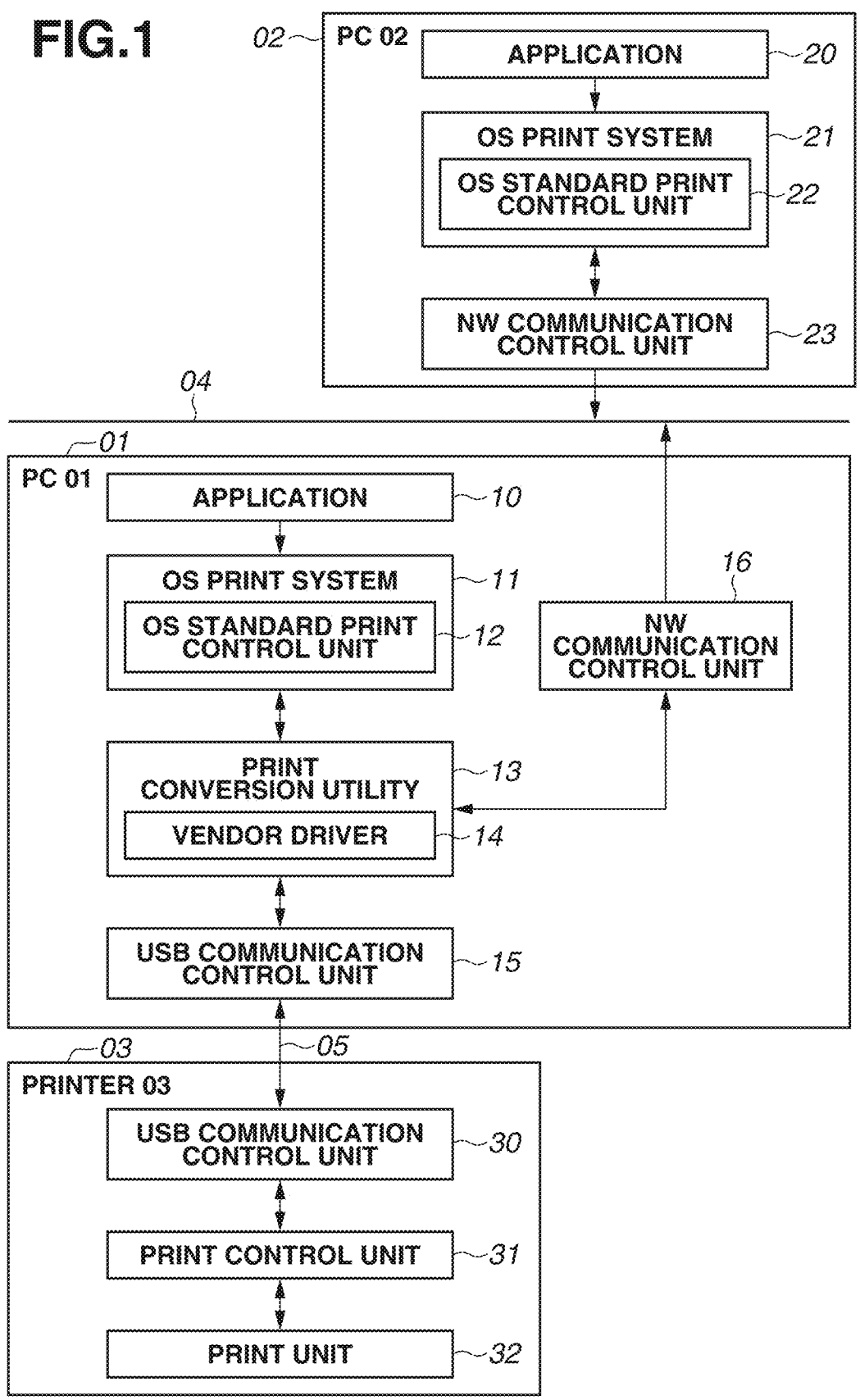
FIG. 1 illustrates an entire configuration of a print system according to an exemplary embodiment.

FIG. 1 illustrates an entire configuration of a print system according to a first exemplary embodiment. A personal computer (PC) 01 and a PC 02 are connected to a network 04 and can communicate with each other. A local area network (LAN) is assumed as a network, but a wide area network (WAN) may be used. A connection form of the network may be wired connection, wireless connection, and a mixture of these forms. The PC 01 is connected to a printer 03 via a Universal Serial Bus (USB) communication control unit 15 and controls the printer 03. A USB is assumed as a communication interface, but the PC 01 may be connected to the printer 03 via the network.

Figure 16:
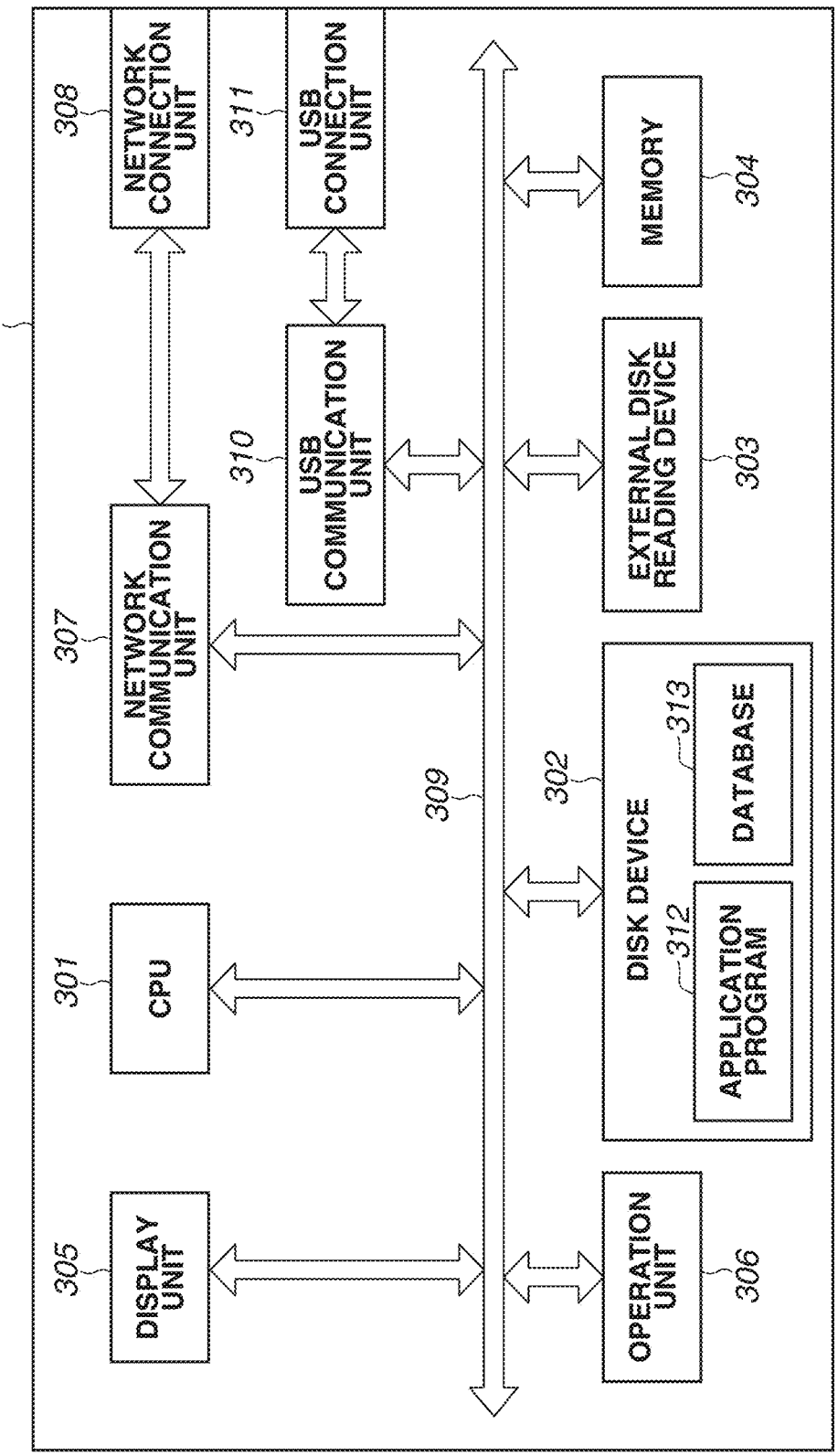
FIG. 16 is a hardware configuration diagram of an information processing apparatus.

It is not illustrated in FIG. 1, but the PC 01 and the PC 02 each incorporate an operating system (OS), and the OS manages PC resources such as each block in the PC. FIG. 16 is a block diagram illustrating a hardware configuration of the PC (an information processing apparatus) 01 or the PC 02. A central processing unit (CPU) 301 controls each unit described below. A disk device 302 stores an application program 312 and a database 313 read by the CPU 301, the OS, and various files. An external disk reading device 303 reads out information such as a file stored in an external storage medium such as a secure digital (SD) card. A memory 301 includes a random access memory (RAM) and is used by the CPU 301 for temporary storage and buffering of data as necessary. A display unit 305 includes, for example, a liquid crystal display (LCD) and displays various pieces of information. An operation unit 306 includes a keyboard and a mouse for a user to perform various input operations. A network communication unit 307 is connected to a network such as the Internet via a network connection unit 308 and performs various types of communication. The network communication unit 307 is compatible with a wired LAN and a wireless LAN. The network connection unit 308 is a connector for connecting a cable of the wired LAN in the case of being compatible with the wired LAN and is an antenna in the case of being compatible with the wireless LAN. The network connection unit 308 may be compatible with both of the wired LAN and the wireless LAN. A USB communication unit 310 is connected to various peripheral apparatuses via a USB connection unit 311 and performs various types of communication. The above-described units are connected to each other by a bus 309. Processing in each flowchart described below s realized by the CPU 301 reading a program related to processing in the flowchart from the memory 304 and executing the program. According to the present exemplary embodiment, a macOS® is assumed as the OS incorporated into the PC 01 and the PC 02.

A software configuration of the PC 01 is described. The PC 01 includes an application 10, an OS print system 11, an OS standard print control unit 12, a print conversion utility 13, a vendor driver 14, the USB communication control unit 15, and a network (NW) communication control unit 16 and can execute these components. The OS print system 11 including the OS standard print control unit 12 is a standard module included in the OS. In other words, a user does not need to individually install the OS print system 11 and the OS standard print control unit 12, and the OS print system 11 and the OS standard print control unit 12 are installed together with installation of the OS. Therefore, the OS print system 11 including the OS standard print control unit 12 is sometimes referred to as OS standard print software.

The print conversion utility 13 including the vendor driver 14 is used in a case where printing is performed by a printer which cannot interpret print data in a format according to an OS standard print function described below and is installed on the PC 01 by a user as necessary. According to the present exemplary embodiment, a printer which cannot interpret print data in a predetermined format according to the OS standard print function (a printer not supporting the OS standard print function) is sometimes referred to as a non-support printer. In addition, a printer which can interpret print data in the format according to the OS standard print function (a printer supporting the OS standard print function) is sometimes referred to as a support printer. The OS print system 11 sequentially processes a print request from the application 10 of the PC 01 as a job. In a case where a user requests printing of application data generated by the application 10 of the PC 01, the request is input to the OS print system 11 of the PC 01 as a print job.

In a case where a print job is input, the OS print system 11 generates print data in the format according to the OS standard print function using the OS standard print control unit 12. It is assumed that the printer 03 connected to the PC 01 is a printer which cannot interpret print data in the format according to the OS standard print function. In a case where a user selects such a printer 03 and instructs printing, the print conversion utility 13 is used. In other words, the OS print system 11 transmits the print data in the format according to the OS standard print function generated by the OS standard print control unit 12 to the print conversion utility 13. Then, the print conversion utility 13 converts the print data transmitted from the OS print system 11 into print data in a vendor-specific format using the vendor driver 14 and transmits the converted print data to the printer 03 via the USB communication control unit 15. A case is described in which a user selects a printer which can interpret print data in the format according to the OS standard print function. In a case where such a printer is selected, the print data in the formal according to the OS standard print function generated by the OS standard print control unit 12 is transmitted to the selected printer without using the print conversion utility 13. A protocol to be used in this case is, for example, an Internet Printing Protocol.

The PC 02 includes an application 20, an OS print system 21, an OS standard print control unit 22, and a NW communication control unit 23. The print conversion utility 13 of the PC 01 can be used from another PC on the network, and a user can use the printer 03 connected to the PC 01 from the PC 02 via the print conversion utility 13 of the PC 01. Similarly in the PC 02, the OS print system 21 sequentially processes a print request from the application 20 as a job. In a case where a user selects the printer 03 and requests printing of application data generated by the application 20 of the PC 02, the request is input to the OS print system 21 of the PC 02 as a print job. Upon receiving the print job, the OS print system 21 of the PC 02 transmits the print job to the print conversion utility 13 of the PC 01 via the network 04. Subsequent processing is performed as described above.

The printer 03 includes a USB communication control unit 30, a print control unit 31, and a print unit 32. The print control unit 31 receives the print data from the PC 01 via the USB communication control unit 30 and executes printing by controlling the print unit 32 based on the print data. The printer 03 includes sheet feeding trays in two-stage cassettes, corresponds to a sheet size of A4 size, A5 size, L-size, and postcard size, and corresponds to a sheet type of plain paper, glossy photo paper, matte photo paper, and a postcard. According to the present exemplary embodiment, printing using an ink-jet method is assumed, but another method such as an electrophotogaphic method may be used. The OS print system 11 provides the OS standard print function, and in the case of the support printer which can interpret print data in the format according to the OS standard print function, a user can perform printing without using the print conversion utility 13. In addition, the support printer has a function of identifying a size and a type of a sheet set in the sheet feeding tray of its own. In a case where a user specifies the sheet size and requests printing on a print setting screen provided by the OS print system 11, the support printer feeds a sheet from the sheet feeding tray in which the sheet having the specified sheet size is set, according to the specified sheet size. Then, the support printer performs printing appropriate for the type of the sheet fed from the sheet feeding tray.

On the other hand, the non-support printer cannot interpret print data in the format according to the OS standard print function. Further, the non-support printer does not have a function of identifying a size and a type of a sheet set in the sheet feeding tray by a user and responding with response information to the OS standard print function. Therefore, it is necessary to use the print conversion utility 13 in a case where a user performs printing using the non-support printer. According to the present exemplary embodiment, the non-support printer cannot identify the size and the type of the sheet set in each sheet feeding tray. Therefore, a user sets the size and the type of the sheet set in each sheet feeding tray in the non-support printer to the print conversion utility 13 in advance. Then, the user specifies the sheet size on the print setting screen provided by the OS print system 11 and requests printing. According to the request, the print conversion utility 13 generates print data which instructs to feed a sheet from the sheet feeding tray in which a sheet having a sheet size that is the same as the specified sheet size is set and to execute printing appropriate for the sheet type set in the sheet feeding tray and transmits the print data to the printer.

Figure 2:
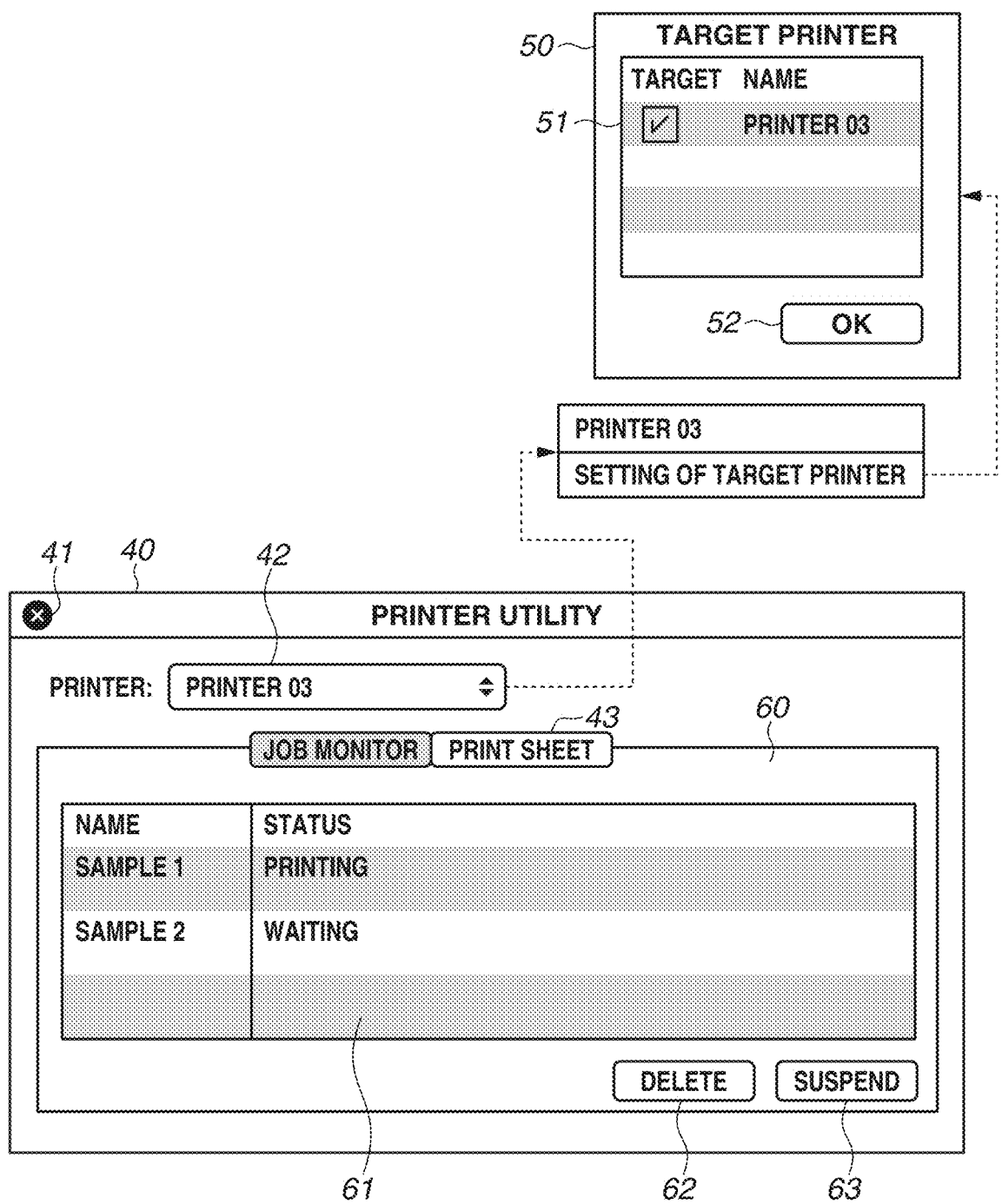
FIG. 2 illustrates a printer management screen of a print conversion utility.
Figure 3:
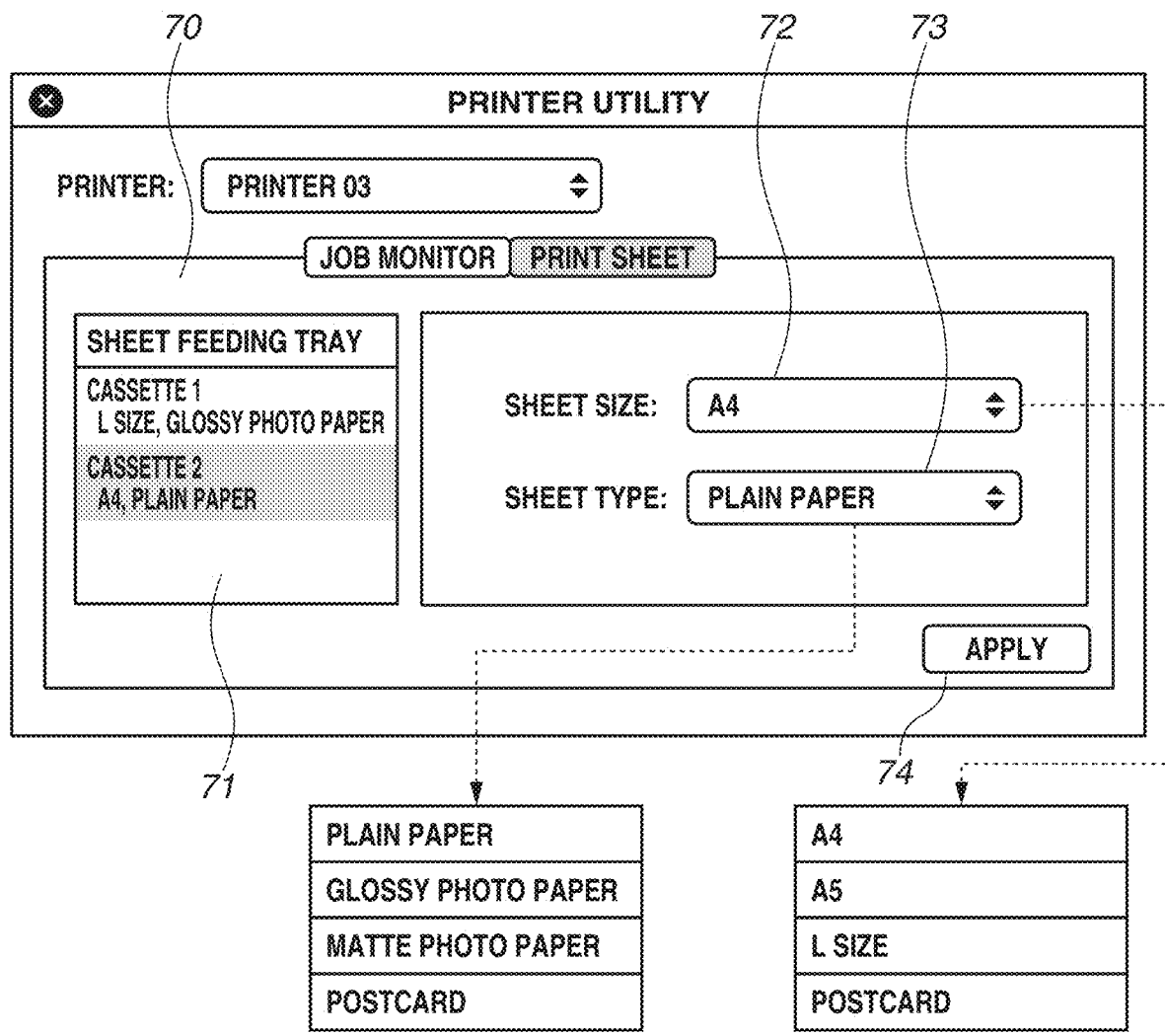
FIG. 3 illustrates the printer management screen of the print conversion utility.

FIGS. 2 and 3 illustrate a printer management screen 40 of the print conversion utility 13. According to the present exemplary embodiment, the print conversion utility 13 includes a job monitoring area for monitoring a state of a job in the selected printer and a print sheet area for setting the size and the type of the sheet set in the sheet feeding tray of the printer as a sheet to be used for printing. The print conversion utility 13 displays a name of a printer which is already registered in a printer selection menu 42, as an operation target of the print conversion utility 13 and "setting of a target printer" which is an item for setting addition or deletion of the operation target printer. In a case where a user selects "setting of a target printer", the print conversion utility 13 opens a target printer setting screen 50. The print conversion utility 13 displays the non-support printer connected to the PC 01 in a target printer list 51. The user sets a check box of each printer displayed in the target printer list 51 to be enabled or disabled and thus can set whether to register the non-support printer as the operation target of the print conversion utility 13.

In a case where the user presses an OK button 52, the print conversion utility 13 closes the target printer setting screen 50. According to the present exemplary embodiment, the user sets the non-support printer 03 as the operation target of the print conversion utility 13. The print conversion utility 13 responds to the OS print system 11 by adding correspondence information (support information) for the OS standard print function generated inside of the print conversion utility 13 based on capability information obtained from the non-support printer, instead of the non-support printer set as the operation target. The user selects the non-support printer set as the operation target in the printer selection menu 42 and thus can monitor a state of a job in the non-support printer and set the size and the type of the sheet set in the sheet feeding tray. The user can switch the job monitoring area and the print sheet area using an area switching tab 43. In a case where the user selects "job monitor" using the area switching tab 43, the print conversion utility 13 displays a job monitoring area 60 illustrated in FIG. 2. In a case where the user selects the "print sheet" using the area switching tab 43, the print conversion utility 13 displays a print sheet area 70 illustrated in FIG. 3.

FIG. 2 illustrates the printer management screen in which the job monitoring area is displayed. The print conversion utility 13 displays a name and a processing status of a print job being processed by the selected printer 03 in a job list 61. A user can delete or suspend the print job selected from the job list 61 using a deletion button 62 or a suspension button 63. In a case where the user presses a close button 41, the print conversion utility 13 closes the printer management screen 40 and terminates processing. However, if the print job is being processed, the print conversion utility 13 notifies the user that the print job is being processed and does not terminate the processing.

FIG. 3 illustrates the printer management screen 40 in which the print sheet area (sheet information setting screen) 70 is displayed. A user can select the sheet feeding tray to which the sheet size and the sheet type are set from a sheet feeding tray list 71. The user can set the sheet size and the sheet type of the sheet feeding tray selected in the sheet feeding tray list 71 using a sheet size selection menu 72 and a sheet type selection menu 73. In a case where the user presses an application button 74, the sheet size and the sheet type of each sheet feeding tray set in this screen are applied in a case where the print conversion utility 13 generates print data. The print conversion utility 13 converts print data in the format according to the OS standard print function transmitted from the OS print system 11 into print data in the vendor-specific format based on the sheet size and the sheet type set by the user in this screen.

FIG. 4 illustrates a printer list screen and a printer registration screen of the OS print system 11 operating on the PC 01. The OS print system 11 includes a printer list screen 80 for adding and deleting a printer available for printing. The OS print system 11 displays in a printer list 81 all printers which can be selected when printing is performed. In a case where a user selects a printer from the printer list 81 and presses a delete button 83, the OS print system 11 deletes a print queue of the selected printer and deletes the selected printer from the printer list 81. In a case where a user presses an addition button 82, the OS print system 11 displays a printer registration screen 84. The OS print system 11 is connected to the PC 01 and displays all printers supporting the OS standard print function, in a registered printer list 85. The OS print system 11 obtains a printer name and capability information including correspondence information with respect to the OS standard print function from the connected printer and displays the name and a connection method of the printer corresponding to the OS standard print function in the registered printer list 85. The OS print system 11 obtains the capability information also from the print conversion utility 13. In other words, according to the present exemplary embodiment, the printer 03 is set as the operation target of the print conversion utility 13. Therefore, the print conversion utility 13 generates the capability information added with the correspondence information with respect to the OS standard print function generated inside of the print conversion utility 13 based on the capability information obtained from the printer 03. Further, in a case where a request for obtaining the capability information is received from the OS print system 11, the print conversion utility 13 responds to the OS print system 11 with the capability information added with the correspondence information as the capability information of the printer 03. In this regard, the print conversion utility 13 responds to the OS print system 11 with the capability information in which "print conversion utility" is added to the name obtained from the printer 03 as predetermined identification information. Information to be added as the predetermined identification information may be other information.

The OS print system 11 displays the name of the printer 03 "the printer 03 (a print conversion utility)" and a connection method "USB" in the registered printer list 85 based on the capability information obtained from the print conversion utility 13. The name of the printer is displayed as described above, and thus a user can recognize that the printer 03 is the non-support printer, and the print conversion utility 13 is used. In a case where the printer connected to the PC 01 is the support printer, a name to be displayed in the registered printer list 85 is a name included in the capability information responded from the printer. Therefore, the print conversion utility is not displayed as a printer name. In a case where the user selects the printer from the registered printer list 85 and presses a registration button 87, the OS print system 11 generates a print queue of the selected printer. Further, the OS print system 11 displays the selected printer in the printer list 81 and closes the printer registration screen 84. In a case where the user presses a cancel button 86, the OS print system 11 closes the printer registration screen 84 without registering the printer.

Figure 5:
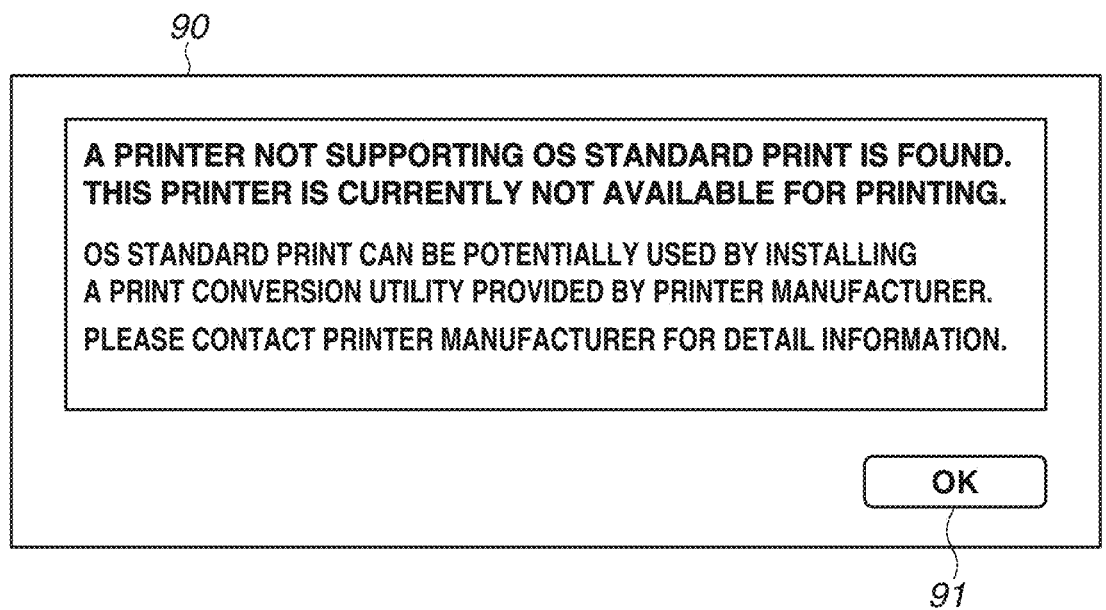
FIG. 5 illustrates a print conversion utility guide dialogue of the OS print system.
Figure 6:
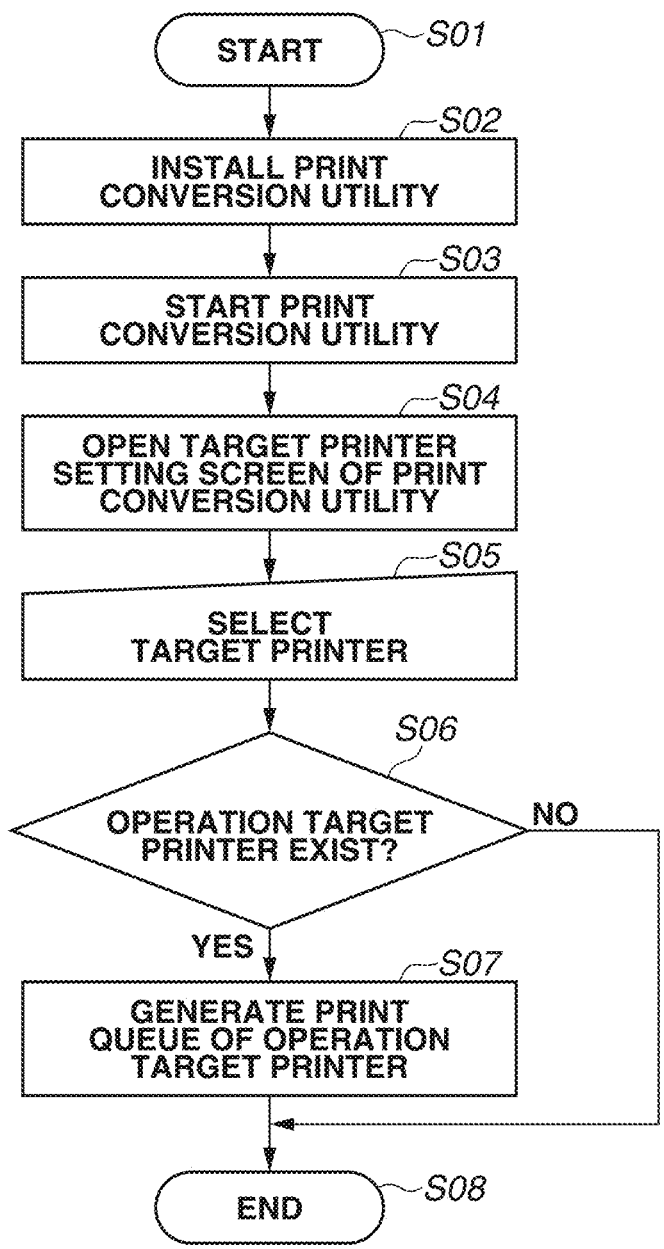
FIG. 6 illustrates a processing flow of an installer of the print conversion utility.

According to the present exemplary embodiment, it is assumed that the print conversion utility 13 is already installed on the PC 01. However, if the print conversion utility 13 is not yet installed, a user is prompted to install the print conversion utility 13 as necessary as illustrated in FIGS. 5 and 6. In the installation processing, a print queue for performing printing using the OS standard print function is generated via the print conversion utility 13. An example of installation is described below.

FIG. 5 illustrates a guide dialogue 90 displayed by the OS print system 11. In a case where the OS print system 11 determines that the non-support printer is connected to the PC 01 in a case where a user presses the addition button 82 on the printer list screen 80 illustrated in FIG. 4, the OS print system 11 displays the guide dialogue 90 before displaying the printer registration screen 84 illustrated in FIG. 4. In a case where the user presses an OK button 91, the OS print system 11 closes the guide dialogue 90 and opens the printer registration screen 84 illustrated in FIG. 4.

FIG. 6 illustrates a processing flow of a program (hereinbelow, referred to as an installer) for installing the print conversion utility 13. It is not illustrated, but the installer is downloaded by a user from a specific web server to the PC 01. In a case where the user starts the installer, in step S01, the installer starts processing. In step S02, the installer installs the print conversion utility 13 on the PC 01. In step S03, the installer starts the print conversion utility 13, and, in step S04, opens the target printer setting screen 50 of the print conversion utility 13. In step S05, the installer receives selection of a printer and an operation on the OK button 52 by the user on the target printer setting screen 50. Subsequently, the print conversion utility 13 adds the correspondence information with respect to the OS standard print function generated inside of the print conversion utility 13 based on the capability information obtained from the target printer selected by the user to the capability information obtained from the target printer. Further, in a case where a request for obtaining the capability information is received from the OS print system 11, the print conversion utility 13 responds to the OS print system 11 with the capability information added with the correspondence information.

In step S06, in a case where the installer determines that the operation target printer exists (YES in step S06), in step S07, the installer requests the OS print system 11 to generate a print queue of the printer set by the user as the operation target. The OS print system 11 generates the print queue for performing printing using the OS standard print function via the print conversion utility 13 based on the capability information responded from the print conversion utility 13. Then, in step S08, the installer terminates the processing. In step S06, in a case where the installer determines that the operation target printer does not exist (NO in step S06), then, in step S08, the installer terminates the processing.

In other words, the print queue of the target printer selected as the operation target of the print conversion utility 13 may be generated using the screen in FIG. 4 or generated by the installer.

FIG. 7 illustrates a printer list screen and a printer registration screen of the OS print system 21 operating on the PC 02. The print conversion utility 13 operating on the PC 01 can respond to the OS print system 21 of the PC 02 via the network 04 with the capability information added with the correspondence information with respect to the OS standard print function generated inside of the print conversion utility 13 based on the capability information Obtained from the printer 03. The OS print system 21 of the PC 02 displays the printer 03 which is the operation target printer of the print conversion utility 13 operating on the PC 01 on a printer registration screen 104. In a case where a user selects the printer 03 and presses a registration button 107, the OS print system 21 of the PC 02 generates a print queue of the selected printer and displays the printer 03 in a printer list 101.

Figure 8:
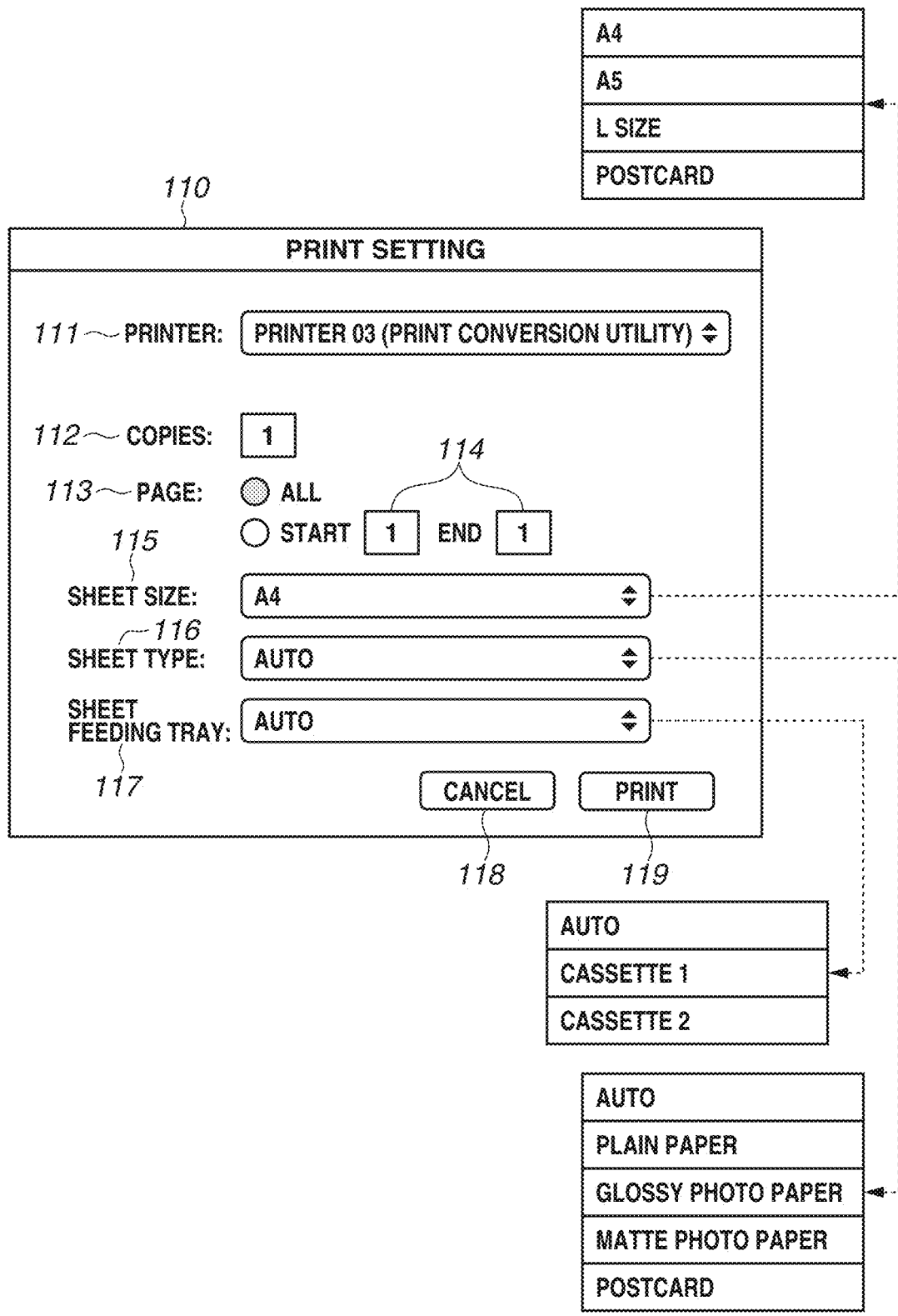
FIG. 8 illustrates a print setting screen of the OS print system.

FIG. 8 illustrates a print setting screen of the OS print system 11. The OS print system 11 operating on the PC 01 is described as an example, but the OS print system 21 operating on the PC 02 includes a similar screen. The OS print system 11 includes a print setting screen 110 for printing each piece of data generated by the application 10. In other words, in a case where a user selects a print menu in the application 10, the OS print system 11 displays the print setting screen 110 in FIG. 8. The user can set a printer to be used for printing in a printer selection menu 111. The OS print system 11 displays the printer available for printing added in the printer list screen 80 in FIG. 4 as the selectable printer in the printer selection menu 111. In other words, the printer to which the print queue is generated is displayed in the printer selection menu 111.

The user can set the number of copies using a number of copies setting field 112. The user can set a page to be printed using a page setting radio button 113 and a page designation text field 114. The user can set the sheet size to be used for printing using a sheet size menu 115. The user can set any of the sheet size from A4, A5, L-size, and a postcard which can be used for printing by the printer. The user can set the sheet type to be used for printing using a sheet type setting menu 116. The user can set any of the sheet type from plain paper, glossy photo paper, matte photo paper, and a postcard which can be used for printing by the printer. In addition, the user may not specify a specific sheet type by setting "AUTO". In this case, if a sheet size that is the same as the sheet size set to the sheet size menu 115 is set to the print sheet area 70 of the print conversion utility 13, the sheet type set together with the sheet size is applied.

The user can set a tray from which the print sheet is fed using a sheet feeding tray setting menu 117. The user can set any of the sheet feeding tray from cassettes 1 and 2 from which the printer can feed the print sheet. In addition, the user may not specify a specific sheet feeding tray by setting AUTO. In this case, if a sheet size that is the same as the sheet size set to the sheet size menu 115 is set to the print sheet area 70 of the print conversion utility 13, the sheet feeding tray to which the sheet size is set is applied. In a case where the user presses a print button 119, a print job based on the settings on the screen is input to the OS print system 11. In a case where the user presses a cancel button 118, the print job is not input.

Figure 9:
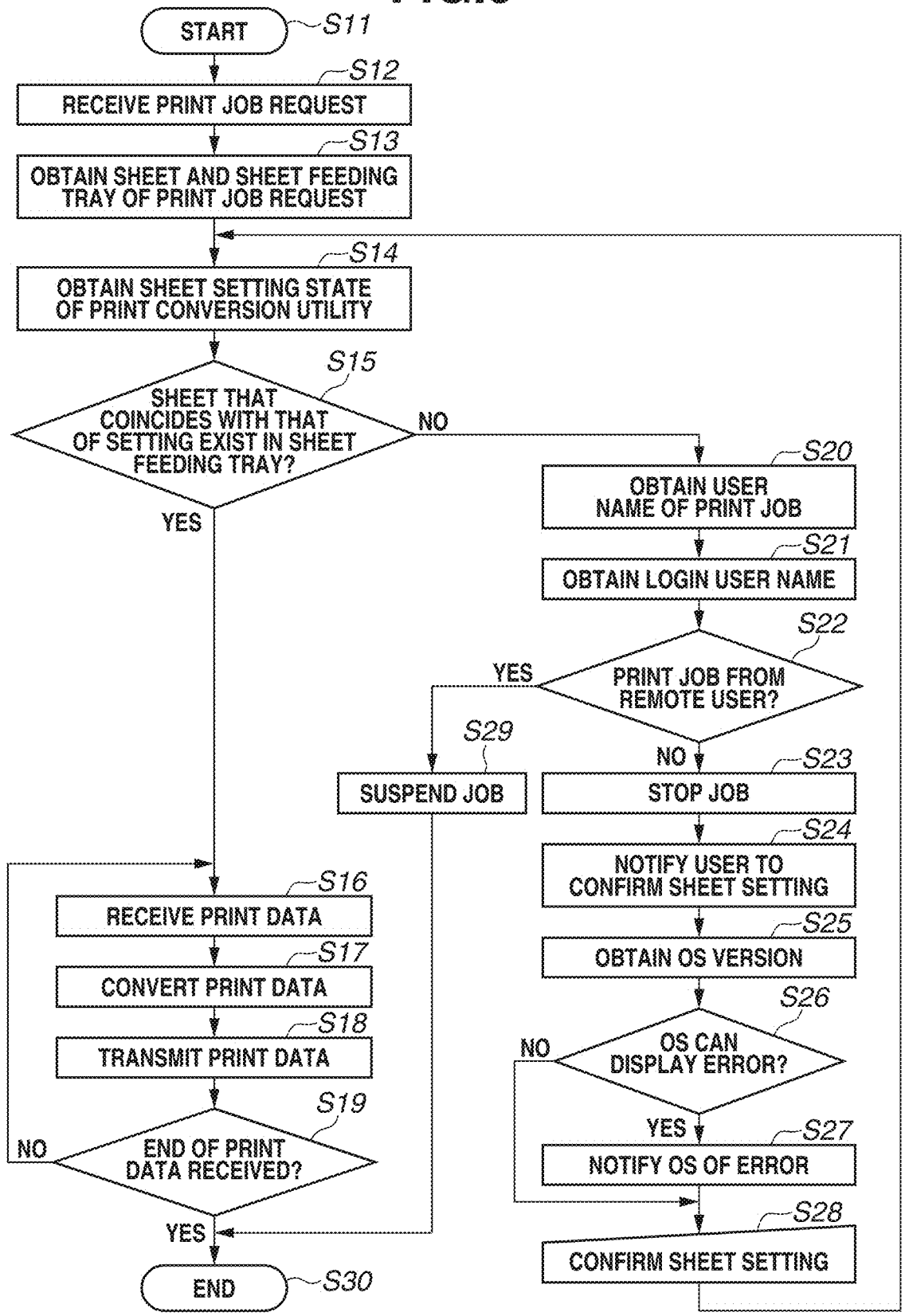
FIG. 9 illustrates a processing flow of the print conversion utility.

FIG. 9 illustrates a processing flow of the print conversion utility 13. In a case where the print conversion utility 13 receives a print job from the OS print system 11, in step S11, the print conversion utility 13 starts processing of the print job. In step S12, the print conversion utility 13 receives a print job request. In step S13, the print conversion utility 13 obtains print setting information including the sheet size, the sheet type, and the sheet feeding tray used for printing. These pieces of information are included in the print job request and correspond to the contents set in FIG. 8 as described above. In step S14, the print conversion utility 13 obtains the size and the type of the sheet in each sheet feeding tray of the printer set in the print sheet area 70 of the print conversion utility 13 as the sheet set by the user to the printer.

In step S15, the print conversion utility 13 determines whether it is necessary to notify the user of the sheet setting. Specifically, the print conversion utility 13 determines whether the sheet size, the sheet type, and the sheet feeding tray which are specified on the print setting screen 110 and included in the print job request are included in the information set in the print sheet area 70 of the print conversion utility 13. In other words, the print conversion utility 13 executes determination processing in step S15 based on the values obtained in steps S13 and S14. The determination processing in step S15 is described. For example, in a case where A4, plain paper, and the cassette 2 are set to the print job request, the print conversion utility 13 compares the sheet size and the sheet type set to the cassette 2 in the information obtained in step S14 with the sheet size and the sheet type obtained in step S13. If both settings coincide with each other, it is determined as "YES" in step S15, and the processing in step S16 is executed. On the other hand, if both settings do not coincide with each other, it is determined as "NO" in step S15, and the processing in step S20 is executed. In a case where the sheet feeding tray obtained in step S13 is set to AUTO, the print conversion utility 13 compares the settings of the sheet size and the sheet type of each tray obtained in step S14 with the information obtained in step S13. In a case where the information obtained in step S13 coincides with the sheet size and the sheet type set to at least one tray in step S14, it is determined as "YES" in step S15. In this case, the print conversion utility 13 applies the information about the tray determined as coinciding with the information obtained in step S13 in the setting information of each tray obtained in step S14. For example, in a case where the information obtained in step S13 includes L-size, glossy photo paper, and AUTO, the print conversion utility 13 determines that the information obtained in step S13 coincides with the information about the cassette 1 in the print sheet area 70. Therefore, the print conversion utility 13 applies the cassette 1 as the sheet feeding tray. On the other hand, in a case where the information obtained in step S13 does not coincide with the sheet size and the sheet type of each tray obtained in step S14, it is determined as "NO" in step S15. Further, in a case where the sheet type and the sheet feeding tray obtained in step S13 are set to AUTO, the print conversion utility 13 compares the sheet size of each tray obtained in step S14 with the sheet size obtained in step S13. In a case where the sheet size obtained in step S13 coincides with the sheet size set to at least one tray obtained in step S14, it is determined as "YES" in step S15. In this case, the print conversion utility 13 applies the information about the tray determined as coinciding with the information obtained in step S13 in the setting information of each tray obtained in step S14. For example, in a case where the information obtained in step S13 includes L-size, AUTO, and AUTO, the print conversion utility 13 determines that the information obtained in step S13 coincides with the information about the cassette 1 in the print sheet area 70. Therefore, the print conversion utility 13 applies glossy photo paper and the cassette 1 as the sheet type and the sheet feeding tray, respectively. On the other hand, in a case where the sheet size obtained in step S13 does not coincide with the sheet size of each tray obtained in step S14, it is determined as "NO" in step S15. In other words, the print conversion utility 13 does not determine setting states of the sheet type and the sheet feeding tray in a case where the sheet type and the sheet feeding tray are set to AUTO on the print setting screen 110.

In step S15, in a case where the print conversion utility 13 determines that it is not necessary to notify the user of the sheet setting (YES in step S15), in step S16, the print conversion utility 13 receives print data from the OS print system 11. In step S17, the print conversion utility 13 converts the received print data in the format according to the OS standard print function into print data in the vendor-specific format. In step S18, the print conversion utility 13 transmits the converted print data to the printer. In step S19, the print conversion utility 13 determines whether print data is received to the end from the OS print system 11. In step S19, if it is determined that the print data is not received to the end (NO in step S19), the print conversion utility 13 returns the processing to step S16 and receives subsequent print data from the OS print system 11. In step S19, if it is determined that the print data is received to the end (YES in step S19), in step S30, the print conversion utility 13 terminates the processing of the print job.

In step S15, in a case where the print conversion utility 13 determines that it is necessary to notify the user of the sheet setting (NO in step S15), the print conversion utility 13 advances the processing to step S20. In steps S20 to S24, the print conversion utility 13 notifies the user of an insufficient setting in the print sheet area 70 and to confirm the sheet setting. However, the print conversion utility 13 cannot notify the PC 02 which does not include the print conversion utility as illustrated in FIG. 1 to confirm the sheet setting. Therefore, if the print conversion utility 13 detects an insufficient setting in the print sheet area 70 during processing of the print job from the PC 02, the print conversion utility 13 cannot notify the PC 02 of the fact, and a user of the PC 02 cannot immediately notice an occurrence of the insufficient sheet setting. Taking this into consideration, in a case where a print job request source is a user of the PC 01 (hereinbelow, referred to as a local user), the print conversion utility 13 temporarily stops the processing of the print job including a subsequent print job. On the other hand, in a case where the print job request source is a user other than the PC 01 (hereinbelow, referred to as a remote user), the print conversion utility 13 suspends the print job being processed and processes the subsequent print job. Accordingly, the print conversion utility 13 can prevent a job of the local user and a job of another remote user from being left unprocessed while the remote user does not notice the insufficient sheet setting.

Figure 10A:
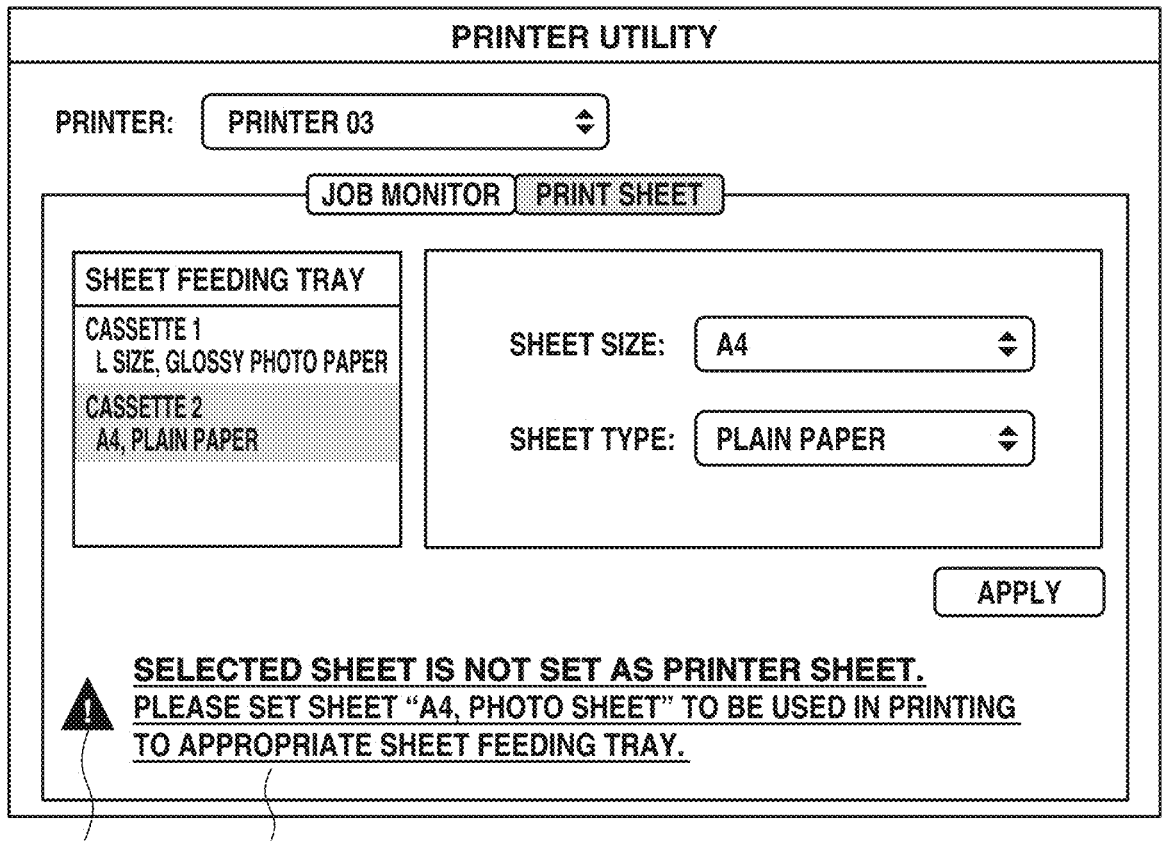
FIGS. 10A and 10B illustrate the printer management screen of the print conversion utility in a case where a warning is displayed.

In step S20, the print conversion utility 13 obtains a user name of the print job included in the print job request, and in step S21, obtains a login user name of the PC 01. In step S22, the print conversion utility 13 determines whether the print job request source is the remote user based on the user name of the print job and the login user name of the PC 01. In other words, the print conversion utility 13 determines as NO in step S22 in a case where the user name obtained in step S20 coincides with the user name obtained in step S21 and determines as YES in step S22 in a case where the both user names do not coincide with each other. According to the present exemplary embodiment, the print conversion utility 13 determines whether the print job request source is the remote user based on the user name included in the print job and the login user name of the PC 01. However, whether the print job request source is the remote user may be determined based on, for example, a PC name without being limited to the above-described configuration. Thus, it can be said that an instruction source, in other words, whether a print instruction to the printer 03 is issued by an external apparatus (the PC 02) connected to the PC 01 via the network is determined in step S22. The determination processing using the user name and the PC name is an example, and user identification information for identifying a user and PC identification information for identifying a PC may be used. In addition, at least one of these types of determination processing may be executed. If it is determined as "NO" in step S22, the processing by the print conversion utility 13 proceeds to step S23, and the print conversion utility 13 executes stopping processing for temporarily stopping the processing of the print job. In step S24, the print conversion utility 13 displays a screen in FIG. 10A to cause a user to confirm the setting state of the print sheet area 70. The print conversion utility 13 displays a warning icon 120 and a message 121 in the print sheet area as illustrated in FIG. 10A and prompts the user to confirm and change the sheet setting. In other words, FIG. 10A illustrates a case in which a user sets A4 and photo paper using the print setting screen 110 in a situation in which L-size and glossy photo paper are set to the cassette 1, and A4 and plain paper are set to the cassette 2 as illustrated in FIG. 3. Therefore, in FIG. 10A, the message 121 prompts the user to set a photo paper sheet having A4 size which is set using the print setting screen 110 to the printer, A message different from the one in FIG. 10A may be displayed. For example, in step S24, the print conversion utility 13 may cause the user to select either one of sheet information set to the cassette 1 and sheet information set to the cassette 2 and generate print data using the sheet information of the selected cassette. In other words, the print conversion utility 13 receives print data to which A4 and photo paper is set from the OS print system 11. Further, the print conversion utility 13 may generate vendor-specific print data using the sheet information of the selected cassette (for example, A4 and plain paper in the cassette 2).

Figure 10B:
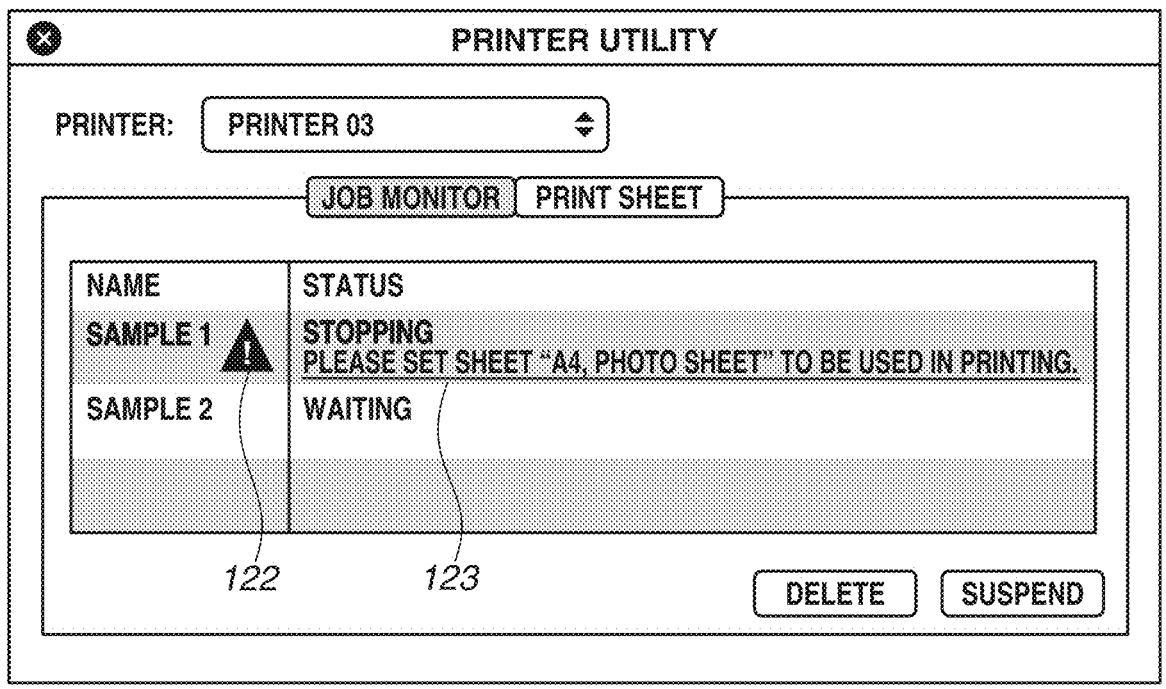

The print conversion utility 13 displays a warning icon 122 and a warning message 123 as a job processing status in the job monitoring area as illustrated in FIG. 10B. In steps S25 to S27, if an error notification function of the OS print system 11 is adequate, the print conversion utility 13 notifies the user that the processing of the print job is temporarily stopped, using the error or notification function of the OS print system 11. The OS print system 11 has a function of notifying a user if an error occurs during the processing of the print job. Therefore, not only the print conversion utility 13 but also the OS print system 11 notify the user that the processing of the print job is temporarily stopped, and thus the user can more easily notice the insufficient sheet setting. However, there is a possibility that the OS print system 11 prompts a user to confirm a state of the printer 03 in a case where it should prompt the user to confirm the setting state of the print conversion utility 13, depending on a version of the OS. Taking this into consideration, the print conversion utility 13 notifies the OS print system 11 that the processing of the print job is temporarily stopped only in a case where the error notification function of the OS print system 11 is adequate.

In step S25, the print conversion utility 13 obtains the version of the OS incorporated in the PC 01, and in step S26, determines whether the error notification function of the OS print system 11 is adequate based on the version of the OS. In other words, in step S26, the print conversion utility 13 executes OS version determination processing. In step S26, in a case where the print conversion utility 13 determines that the error notification function of the OS is adequate (determines that the version of the OS coincides with a predetermined condition) (YES in step S26), the processing proceeds to step S27, and the print conversion utility 13 notifies the OS print system 11 that the processing of the print job is temporarily stopped. In step S26, in a case where the print conversion utility 13 determines that the error notification function of the OS is not adequate (NO in step S26), the processing proceeds to step S28.

In step S28, in a case where the user resets the sheet size and the sheet type of each sheet feeding tray in the print sheet area 70 of the print conversion utility 13, the print conversion utility 13 returns the processing to step S14, obtains the reset sheet size and sheet type, and executes the processing in step S15 again.

Figure 11:
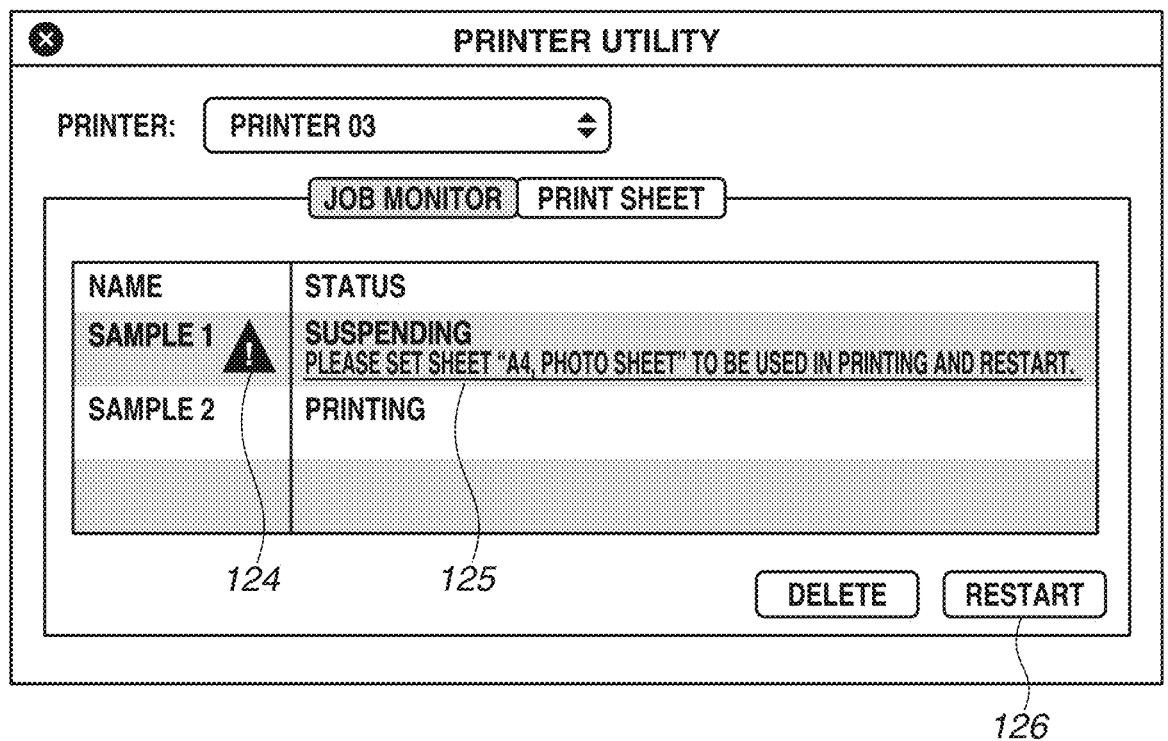
FIG. 11 illustrates the printer management screen of the print conversion utility in a case where a warning is displayed.

In step S22, in a case where it is determined that the print job request source is the remote user (YES in step S22), the processing proceeds to step S29, and the print conversion utility 13 suspends the print job. In this regard, the print conversion utility 13 displays a warning icon 124 and a warning message 125 as a job processing status in the job monitoring area as illustrated in FIG. 11. Then, the print conversion utility 13 terminates the processing of the print job. In a case where the print conversion utility 13 receives a subsequent print job request after the processing in step S29, the processing is restarted from step S12. On the other hand, in step S23, in a case where the print conversion utility 13 receives a subsequent print job request during temporary stop of the processing of the print job, the print conversion utility 13 holds the processing of the subsequent print job until the processing of the print job stopped in step S23 is completed.

In a case where the user selects the suspended job in the job list 61, the print conversion utility 13 displays a restart button 126 instead of the suspension button 63 (FIG. 11). The user can restart the selected job using the restart button 126. According to the present exemplary embodiment, the print conversion utility 13 temporarily stops the processing of the print job including the subsequent print job in a case where the print job request source is the local user. However, the print conversion utility 13 may process the subsequent print job by suspending the print job even in a case where the print job request source is the local user. In this case, the print conversion utility 13 suspends the print job in step S23, notifies the user of the insufficient sheet setting in steps S24 to S27, and terminates the processing. Then, the user resets the sheet size and the sheet type of each sheet feeding tray in the print sheet area 70 of the print conversion utility 13 and instructs restart of the print job suspended in the job monitoring area. Based on this instruction, the print conversion utility 13 receives the restarted print job from the OS print system 11 and executes the processing flow in FIG. 9 again. According to the above-described processing, the print conversion utility 13 can process the subsequent print job which can be printed even if a transmission source of the print job is the local user.

As described above, according to the present exemplary embodiment, in a case where the print conversion utility detects the insufficient sheet setting, the print conversion utility notifies a user of the fact, and thus can improve convenience in print processing. Further, in a case where a transmission source of a job is a local user, the print conversion utility temporarily stops processing of the print job including a subsequent print job and prompts the user to confirm a sheet setting. In a case of a remote user, the print conversion utility suspends only the print job causing the insufficient sheet setting and processes the subsequent print job. The print conversion utility can improve convenience in print processing by switching the processing as described above.

In FIG. 9, the processing in step S15 is performed using the sheet information (the sheet size and the sheet type), but other print setting information may be used. For example, a user can further set double-side printing or one-side printing using the print setting screen 110 in FIG. 8. Further, a user can set double-side printing or one-side printing to each sheet feeding tray using the screen in FIG. 3. Here, a case is assumed in which one-side printing is set to the cassette 2. In a case where a print job request includes settings of A4, plain paper, the cassette 2, and double-side printing in this situation, the print conversion utility 13 compares the information set to the cassette 2 in the information obtained in step S14 with the information obtained in step S13. Accordingly, the print conversion utility 13 determines that these two pieces of information are the same in the sheet size and the sheet type but different in designation of double-side printing and thus determines as NO in step S15. As described above, information different from the sheet information may be used.

In the processing in FIG. 9, the print conversion utility 13 receives a print job request and print data in different steps but may receive them in the same step. For example, the OS print system 11 transmits a print job including the print setting information and print data in step S12. Accordingly, the print conversion utility 13 executes the processing in steps S13 to S15 using the print setting information included in the print job and may perform conversion processing on the print data included in the print job in a case where it is determined as "YES" in step S15.

Next, a second exemplary embodiment of the present disclosure is described. According to the first exemplary embodiment, the printer does not have a function of identifying a size and a type of a set sheet, and the print conversion utility 13 sets the sheet size and the sheet type. Further, in a case where an insufficient sheet setting is detected, the print conversion utility 13 notifies a user of the insufficient sheet setting.

According to the second exemplary embodiment, a printer has a function of detecting a size and a type of a set sheet, but cannot interpret print data in a format according to the OS standard print function. Therefore, the print conversion utility 13 obtains a size of a type of a sheet set in each sheet feeding tray from the printer. The print conversion utility 13 generates print data for instructing to feed a sheet from the sheet feeding tray in which the sheet having a size that is the same as the sheet size obtained from the OS print system 11 is set and to perform printing appropriate for the sheet type set to the sheet feeding tray.

Configurations except the printer management screen illustrated in FIGS. 3, 10A, 10B, and 11 and the processing flow of the print conversion utility 13 illustrated in FIG. 9 according to the first exemplary embodiment are similar according to the present exemplary embodiment, and thus descriptions thereof are omitted.

Figure 12:
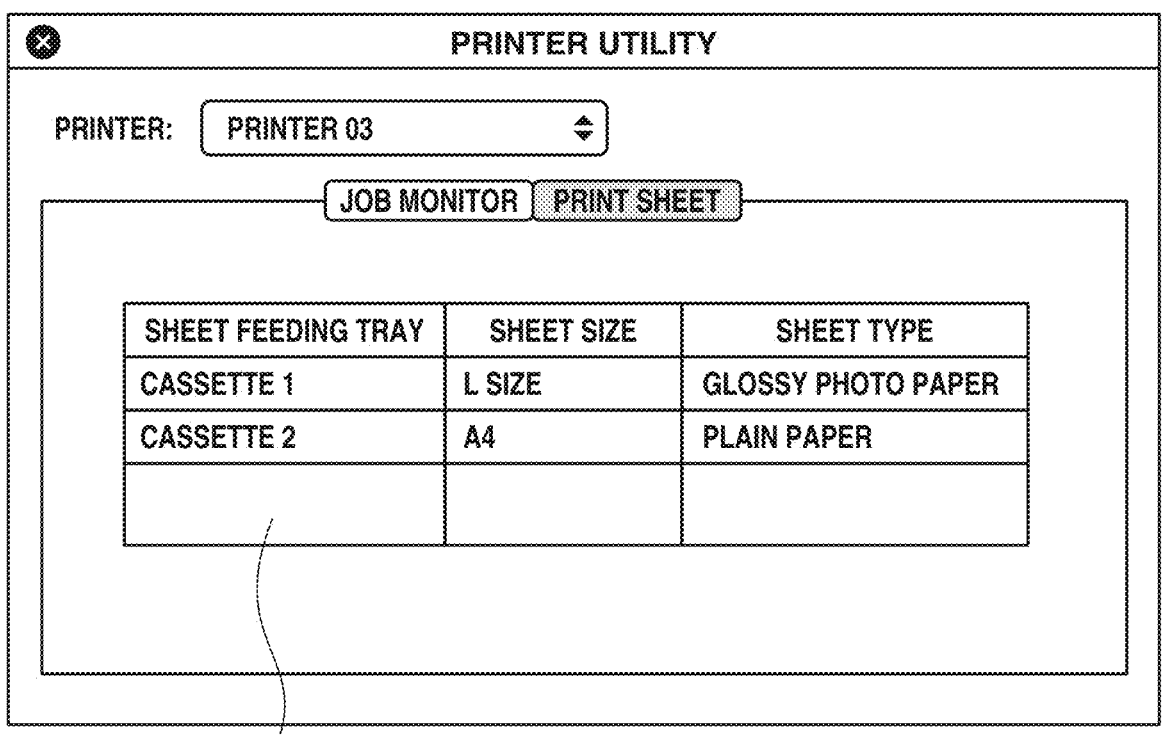
FIG. 12 illustrates the printer management screen of the print conversion utility.

FIG. 12 illustrates a print sheet area in a printer management screen according to the present exemplary embodiment. A user can confirm a sheet size and a sheet type set in the printer using a printer sheet list 130. The print conversion utility 13 obtains the sheet size and the sheet type set to the sheet feeding tray from the printer for every processing of a print job and displays the sheet size and the sheet type in the printer sheet list 130. The print conversion utility 13 generates print data for instructing to feed a sheet from the sheet feeding tray in which the sheet having a size that is the same as the sheet size obtained from the OS print system 11 is set and to perform printing appropriate for the sheet type of the sheet feeding tray.

Figure 13:
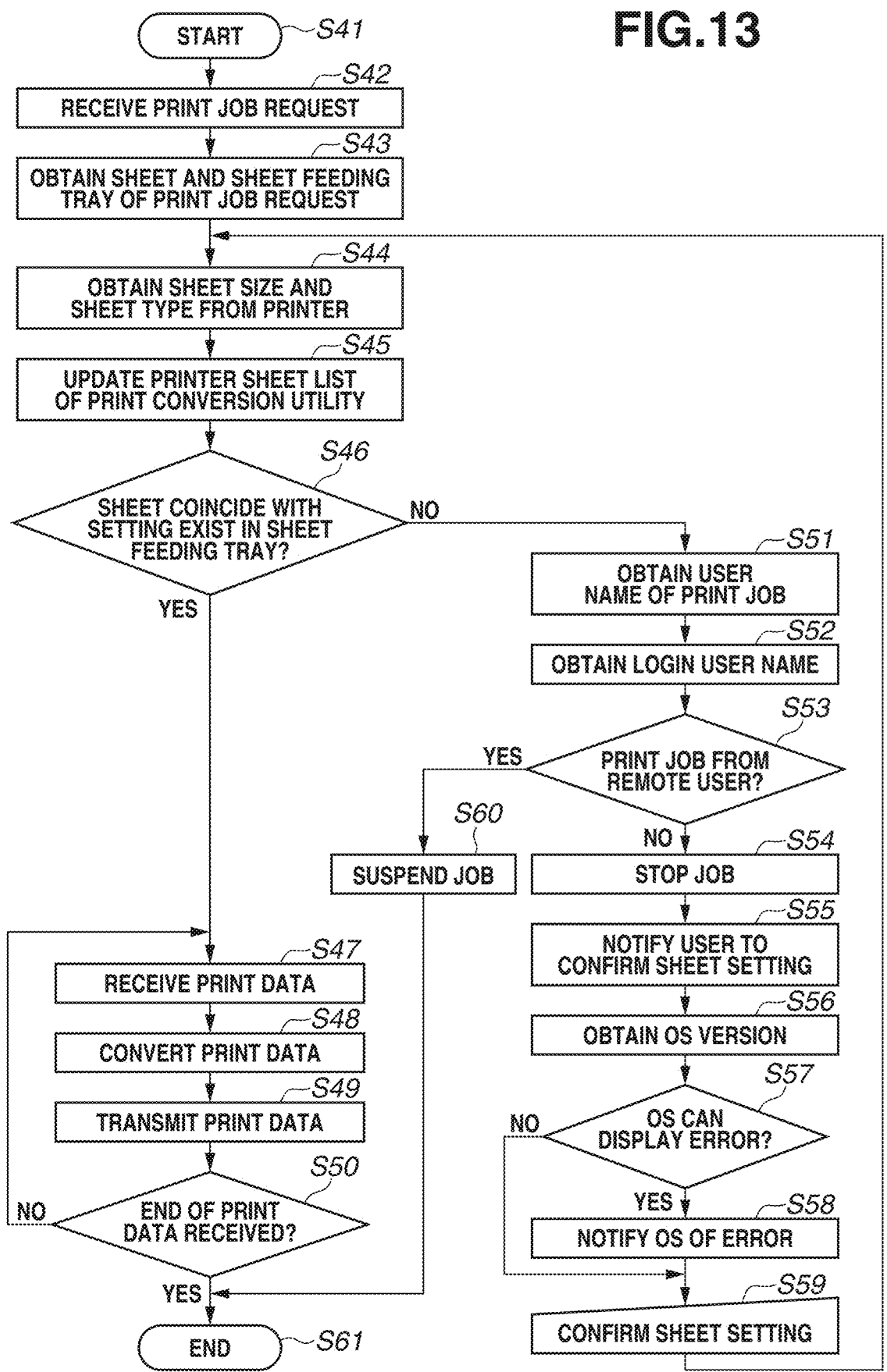
FIG. 13 illustrates a processing flow of the print conversion utility.

FIG. 13 illustrates a processing flow of a print job by the print conversion utility 13. Steps S41 to S43, steps S47 to S54, and steps S56 to S58 are similar to steps S11 to S13, steps S16 to S23, and steps S25 to S27 according to the first exemplary embodiment in FIG. 9, and thus descriptions thereof are omitted. In step S44, the print conversion utility 13 obtains the sheet size and the sheet type set to each sheet feeding tray from the printer 03. The printer 03 detects and stores a sheet size and a sheet type in response to setting of a sheet to each sheet feeding tray and returns the sheet size and the sheet type set to each sheet feeding tray as a response to an inquiry from the print conversion utility 13.

In step S45, the print conversion utility 13 updates the display in the printer sheet list 130 in the print sheet area based on the sheet size and the sheet type obtained from the printer 03. In step S46, the print conversion utility 13 determines whether the sheet size and the sheet type specified in the print setting screen 110 are set to the sheet feeding tray in the specified printer, based on values obtained in steps S43 and S44. In other words, the print conversion utility 13 determines whether it is necessary to notify a user of confirmation of the sheet set to the printer. A determination method in step S46 is basically similar to the determination method in step S15 in FIG. 9, so that detailed descriptions thereof are omitted. A difference between the determination methods in step S15 in FIG. 9 and in step S46 is that the print conversion utility 13 uses the information set in the print sheet area 70 in step S15 in FIG. 9, whereas uses information obtained from the printer in step S46.

Figure 14A:
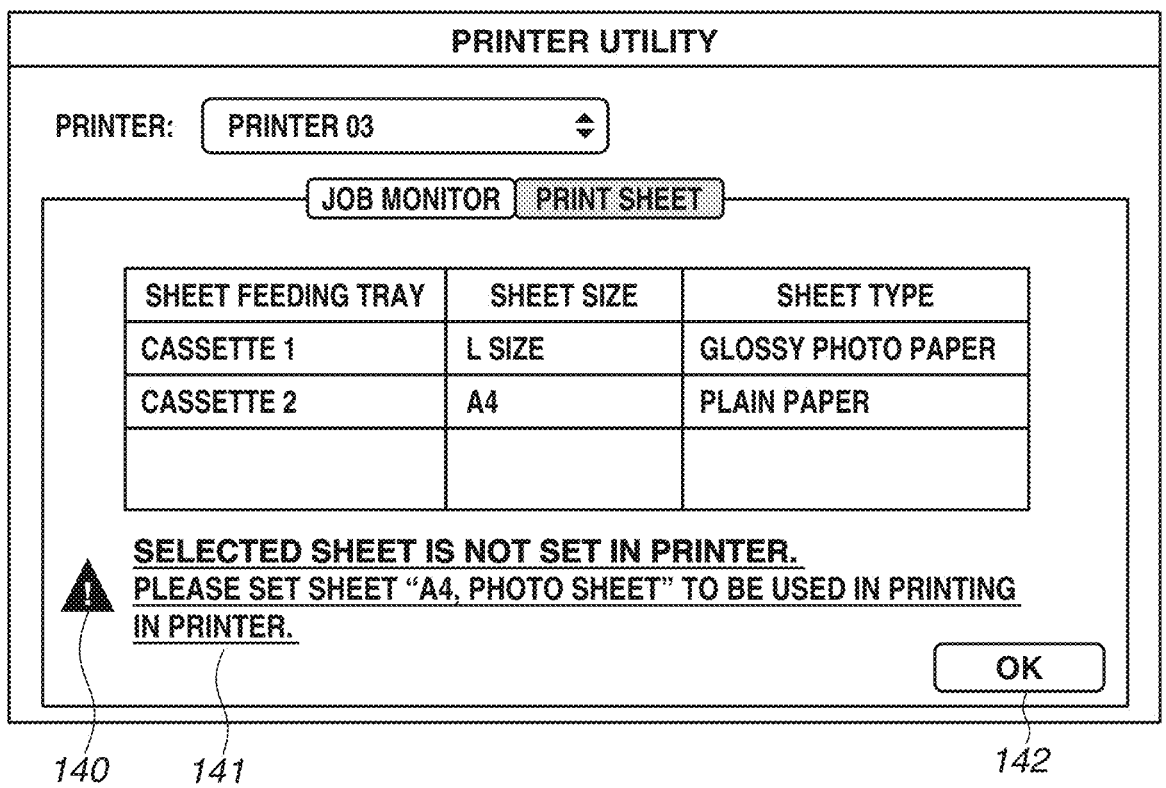
FIGS. 14A and 14B illustrate the printer management screen of the print conversion utility in a case where a warning is displayed.
Figure 14B:
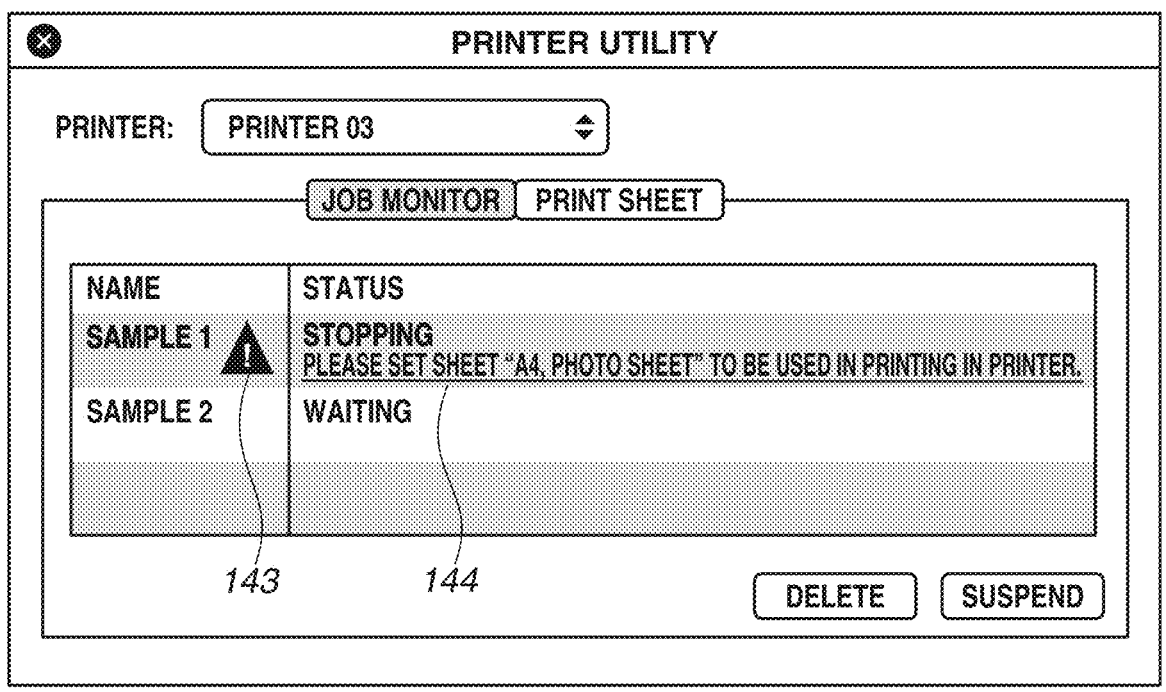
Figure 15:
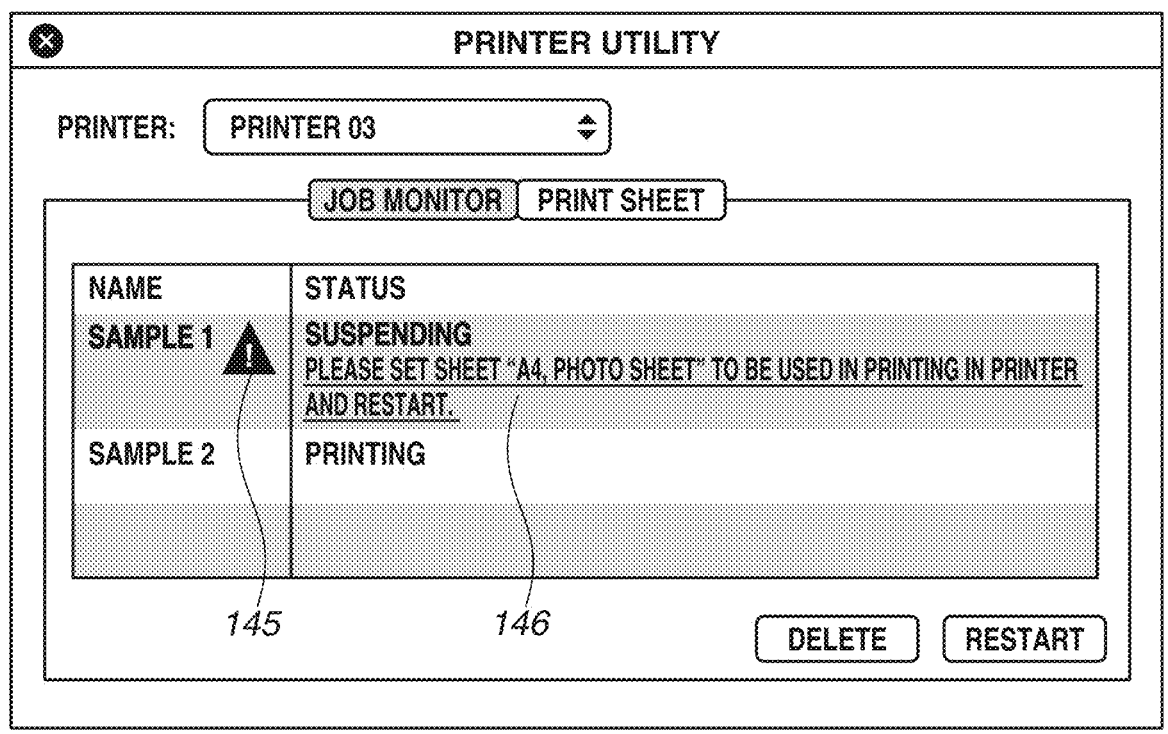
FIG. 15 illustrates the printer management screen of the print conversion utility in a case where a warning is displayed.

In step S46, in a case where it is determined that it is not necessary to notify the user of confirmation of the sheet set in the printer (YES in step S46), then, the print conversion utility 13 executes the processing in steps S47 to S50. On the other hand, in a case where it is determined that it is necessary to notify the user of confirmation of the sheet set in the printer (NO in step S46), the print conversion utility 13 executes the processing in steps S51 to S53. In step S53, in a case where the print conversion utility 13 determines that the print job request source is not a remote user (NO in step S53), in step S54, the print conversion utility 13 temporarily stops the processing of the print job. In step S55, the print conversion utility 13 displays a screen illustrated in FIGS. 14A and 14B to prompt a user to confirm the sheet set in the printer. The print conversion utility 13 displays a warning icon 140 and a message 141 in the print sheet area and prompts the user to confirm and change the sheet set in the printer as illustrated in FIG. 14A. Further, the print conversion utility 13 displays a warning icon 143 and a warning message 144 as a job processing status on the job monitoring area as illustrated in FIG. 14B. In step S59, in a case where the user presses an OK button 142 on the print sheet area of the print conversion utility 13, the print conversion utility 13 returns the processing to step S44 and restarts the processing In step S53, in a case where the print conversion utility 13 determines that the print job request source is the remote user (YES in step S53), then in step S60, the print conversion utility 13 suspends the print job. In this regard, the print conversion utility 13 displays a warning icon 145 and a warning message 146 as a job processing status in the job monitoring area as illustrated in FIG. 15. Then, the print conversion utility 13 terminates the processing of the print job.

As described above, according to the present exemplary embodiment, the print conversion utility 13 obtains the sheet size and the sheet type set to each sheet feeding tray from the printer and notify a user if the insufficient sheet setting is detected. Therefore, the print conversion utility 13 can improve user's convenience. Further, in a case where a transmission source of a job is a local user, the print conversion utility temporarily stops processing of the print job including a subsequent print job and prompts the user to confirm a sheet in the printer. In a case of a remote user, the print conversion utility suspends only the print job causing the insufficient sheet setting and processes the subsequent print job. The print conversion utility can improve convenience in print processing by switching the processing as described above.

According to the present disclosure, convenience of a print operation using a printer which cannot interpret print data in a predetermined format according to an OS standard print function can be improved.

Other Embodiments

Embodiment(s) of the present disclosure can also be realized by a computer of a system or apparatus that reads out and executes computer executable instructions e.g., one or more programs) recorded on a storage medium (which may also be referred to more fully as a 'non-transitory computer-readable storage medium') to perform functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments, The scope of the following claims is to be accorded the broadest interpretation so as to encompass all such modifications and equivalent structures and functions.

This application claims the benefit of Japanese Patent Application No. 2018-225253, filed Nov. 30, 2018, which is hereby incorporated by reference herein in its entirety.

What is claimed is:

1. An information processing apparatus comprising:
    a first obtainment unit configured to obtain print setting information with respect to a printing apparatus;
    a second obtainment unit configured to obtain print setting information set by an operating system (OS) standard print software, wherein the OS standard print software generates first print data in a predetermined format;
    an execution unit configured to stop processing based on a print job issued by a print instruction to a printing apparatus incapable of interpreting print data in the predetermined format and execute a subsequent print job different from the print job in a case where the print setting information with respect to the printing apparatus does not correspond to the print setting information set by the OS standard print software and the print instruction to the printing apparatus incapable of interpreting print data in the predetermined format is issued by an external apparatus connected to the information processing apparatus via a network, and configured to stop the processing based on the print job issued by the print instruction to the printing apparatus incapable of interpreting print data in the predetermined format and processing of the subsequent print job different from the print job in a case where the print setting information with respect to the printing apparatus does not correspond to the print setting information set by the OS standard print software and the print instruction to the printing apparatus incapable of interpreting print data in the predetermined format is issued by a user operation on the information processing apparatus; and
    a generation unit configured to generate second print data which can be interpreted by the printing apparatus based on the first print data in a case where the print setting information with respect to the printing apparatus corresponds to the print setting information set by the OS standard print software,
    wherein the first obtainment unit, the second obtainment unit, the execution unit, and the generation unit are implemented by at least one processor of the information processing apparatus.

2. The information processing apparatus according to claim 1, further comprising a determination execution unit configured to execute processing for determining whether the print setting information with respect to the printing apparatus corresponds to the print setting information set by the OS standard print software,
    wherein the determination execution unit is implemented by at least one processor of the information processing apparatus.

3. The information processing apparatus according to claim 1, further comprising a version determination unit configured to determine a version of the OS,
    wherein, in a case where the version of the OS coincides with a predetermined condition, the OS standard print software receives a notification that the print setting information set by the OS standard print software does not correspond to the print setting information with respect to the printing apparatus,
    wherein the version determination unit is implemented by at least one processor of the information processing apparatus.

4. The information processing apparatus according to claim 1, wherein in a case where the print setting information with respect to the printing apparatus does not correspond to the print setting information set by the OS standard print software, notifying processing of a warning message is executed.

5. The information processing apparatus according to claim 1, further comprising a determination unit configured to determine whether a print instruction with respect to a printing apparatus which cannot interpret print data in the predetermined format is issued by the external apparatus,
    wherein the determination unit is implemented by at least one processor of the information processing apparatus.

6. The information processing apparatus according to claim 5, wherein, in a case where identification information about a user who issues the print instruction does not coincide with identification information about a user who logs into the information processing apparatus, it is determined that the print instruction is issued by the external apparatus connected to the information processing apparatus by the network.

7. The information processing apparatus according to claim 5, wherein, in a case where identification information about an apparatus which issues the print instruction does not coincide with identification information about the information processing apparatus, it is determined that the print instruction is issued by the external apparatus connected to the information processing apparatus by the network.

8. The information processing apparatus according to claim 1, wherein the print setting information with respect to the printing apparatus is input via a setting screen.

9. The information processing apparatus according to claim 1, wherein the print setting information with respect to the printing apparatus is obtained from the printing apparatus.

10. The information processing apparatus according to claim 1, wherein, in a case where a print instruction with respect to a printing apparatus which can interpret print data in the predetermined format is issued, the first print data is transmitted to the printing apparatus which can interpret the print data in the predetermined format, based on an Internet Printing Protocol.

11. The information processing apparatus according to claim 1, wherein the print setting information with respect to the printing apparatus is at least one of a sheet size and a sheet type.

12. A method for controlling an information processing apparatus, the method comprising:
    obtaining print setting information with respect to a printing apparatus;
    obtaining print setting information set by an operating system (OS) standard print software, wherein the OS standard print software generates first print data in a predetermined format;
    stopping processing based on a print job issued by a print instruction to a printing apparatus incapable of interpreting print data in the predetermined format and executing a subsequent print job different from the print job in a case where the print setting information with respect to the printing apparatus does not correspond to the print setting information set by the OS standard print software and the print instruction to the printing apparatus incapable of interpreting print data in the predetermined format is issued by an external apparatus connected to the information processing apparatus via a network, and stopping the processing based on the print job issued by the print instruction to the printing apparatus incapable of interpreting print data in the predetermined format and processing of the subsequent print job different from the print job in a case where the print setting information with respect to the printing apparatus does not correspond to the print setting information set by the OS standard print software and the print instruction to the printing apparatus incapable of interpreting print data in the predetermined format is issued by a user operation on the information processing apparatus; and
    in a case where the print setting information with respect to the printing apparatus corresponds to the print setting information set by the OS standard print software, generating second print data which can be interpreted by the printing apparatus based on the first print data.

13. The method according to claim 12, further comprising executing processing for determining whether the print setting information with respect to the printing apparatus corresponds to the print setting information set by the OS standard print software.

14. The method according to claim 12, further comprising:
    determining a version of the OS; and
    in a case where the version of the OS coincides with a predetermined condition, notifying the OS standard print software that the print setting information set by the OS standard print software does not correspond to the print setting information with respect to the printing apparatus.

15. The method according to claim 12, wherein in a case where the print setting information with respect to the printing apparatus does not correspond to the print setting information set by the OS standard print software, notifying processing of a warning message is executed.

16. The method according to claim 12, further comprising:
    determining whether a print instruction with respect to a printing apparatus which cannot interpret print data in the predetermined format is issued by the external apparatus.

17. The method according to claim 16, further comprising, in a case where identification information about a user who issues the print instruction does not coincide with identification information about a user who logs into the information processing apparatus, determining that the print instruction is issued by the external apparatus connected to the information processing apparatus by the network.

18. The method according to claim 16, further comprising, in a case where identification information about an apparatus which issues the print instruction does not coincide with identification information about the information processing apparatus, determining that the print instruction is issued by the external apparatus connected to the information processing apparatus by the network.

19. The method according to claim 12, wherein the print setting information with respect to the printing apparatus is input via a setting screen.

20. The method according to claim 12, wherein the print setting information with respect to the printing apparatus is obtained from the printing apparatus.

21. The method according to claim 12, further comprising, in a case where a print instruction with respect to a printing apparatus which can interpret print data in the predetermined format is issued, transmitting the first print data to the printing apparatus which can interpret the print data in the predetermined format, based on an Internet Printing Protocol.

22. The method according to claim 12, wherein the print setting information with respect to the printing apparatus is at least one of a sheet size and a sheet type.

* * * * *